(12) United States Patent
Hoffmann

(10) Patent No.: US 11,365,902 B2
(45) Date of Patent: Jun. 21, 2022

(54) SOLAR OVEN POSITIONING

(71) Applicant: Thomas Mark Hoffmann, Santa Cruz, CA (US)

(72) Inventor: Thomas Mark Hoffmann, Santa Cruz, CA (US)

( * ) Notice: Subject to any disclaimer, the term of this patent is extended or adjusted under 35 U.S.C. 154(b) by 0 days.

(21) Appl. No.: 17/243,388

(22) Filed: Apr. 28, 2021

(65) Prior Publication Data
US 2021/0247106 A1     Aug. 12, 2021

Related U.S. Application Data

(60) Continuation-in-part of application No. 16/272,053, filed on Feb. 11, 2019, now abandoned, which is a continuation of application No. 15/474,917, filed on Mar. 30, 2017, now Pat. No. 10,247,447, which is a division of application No. 13/916,499, filed on Jun. 12, 2013, now Pat. No. 9,644,864.

(60) Provisional application No. 61/774,563, filed on Mar. 7, 2013.

(51) Int. Cl.
| | |
|---|---|
| *F24S 20/30* | (2018.01) |
| *F24S 50/20* | (2018.01) |
| *F24S 30/452* | (2018.01) |
| *F24S 30/20* | (2018.01) |

(52) U.S. Cl.
CPC .............. *F24S 20/30* (2018.05); *F24S 30/20* (2018.05); *F24S 30/452* (2018.05); *F24S 50/20* (2018.05); *Y02A 40/926* (2018.01); *Y02B 10/20* (2013.01); *Y02B 40/18* (2013.01); *Y02E 10/47* (2013.01)

(58) Field of Classification Search
CPC .......... F24S 20/30; F24S 30/20; F24S 30/452; F24S 50/20; Y02A 40/926; Y02B 10/20; Y02B 40/18; Y02E 10/47
USPC ........................................................ 126/714
See application file for complete search history.

(56) References Cited

U.S. PATENT DOCUMENTS

| | | | |
|---|---|---|---|
| 2,913,583 A | 11/1959 | Regnier et al. | |
| 4,147,154 A * | 4/1979 | Lewandowski | ....... G01S 3/7861 126/593 |
| 4,172,739 A | 10/1979 | Tassen | |
| 4,619,244 A * | 10/1986 | Marks | ..................... F24S 30/48 126/618 |
| 6,005,236 A | 12/1999 | Phelan et al. | |
| 6,688,303 B2 * | 2/2004 | Davenport | .............. F24S 50/00 126/572 |
| 6,731,250 B1 * | 5/2004 | Berman | ............... H01Q 1/1221 343/883 |
| 8,587,775 B1 | 11/2013 | Wilson et al. | |

(Continued)

*Primary Examiner* — Avinash A Savani
(74) *Attorney, Agent, or Firm* — Douglas L. Weller

(57) ABSTRACT

To position a solar oven radiation collection device, a structural extension assembly extends in a radial direction with respect to a structure. A moveable transport provides linear movement of the solar oven radiation collection device along an axis of the structural extension assembly. A linear deploy electric motor is used to control linear movement of the solar oven radiation collection device along the axis of the structural extension assembly. A solar altitude electric motor is used to adjust orientation of the solar oven radiation collection device to take into account changes in solar altitude with respect to time. A solar azimuth electric motor is used to adjust orientation of the solar oven radiation collection device to take into account changes in azimuth with respect to time.

16 Claims, 29 Drawing Sheets

(56) References Cited

U.S. PATENT DOCUMENTS

| | | | | |
|---|---|---|---|---|
| 2013/0000693 A1* | 1/2013 | Waterhouse | ............ | F24S 25/13 |
| | | | | 136/246 |
| 2013/0084040 A1* | 4/2013 | Scott | ........................ | F21S 11/00 |
| | | | | 385/33 |
| 2014/0230804 A1* | 8/2014 | Siddiqui | ................. | F24S 50/20 |
| | | | | 126/576 |

* cited by examiner

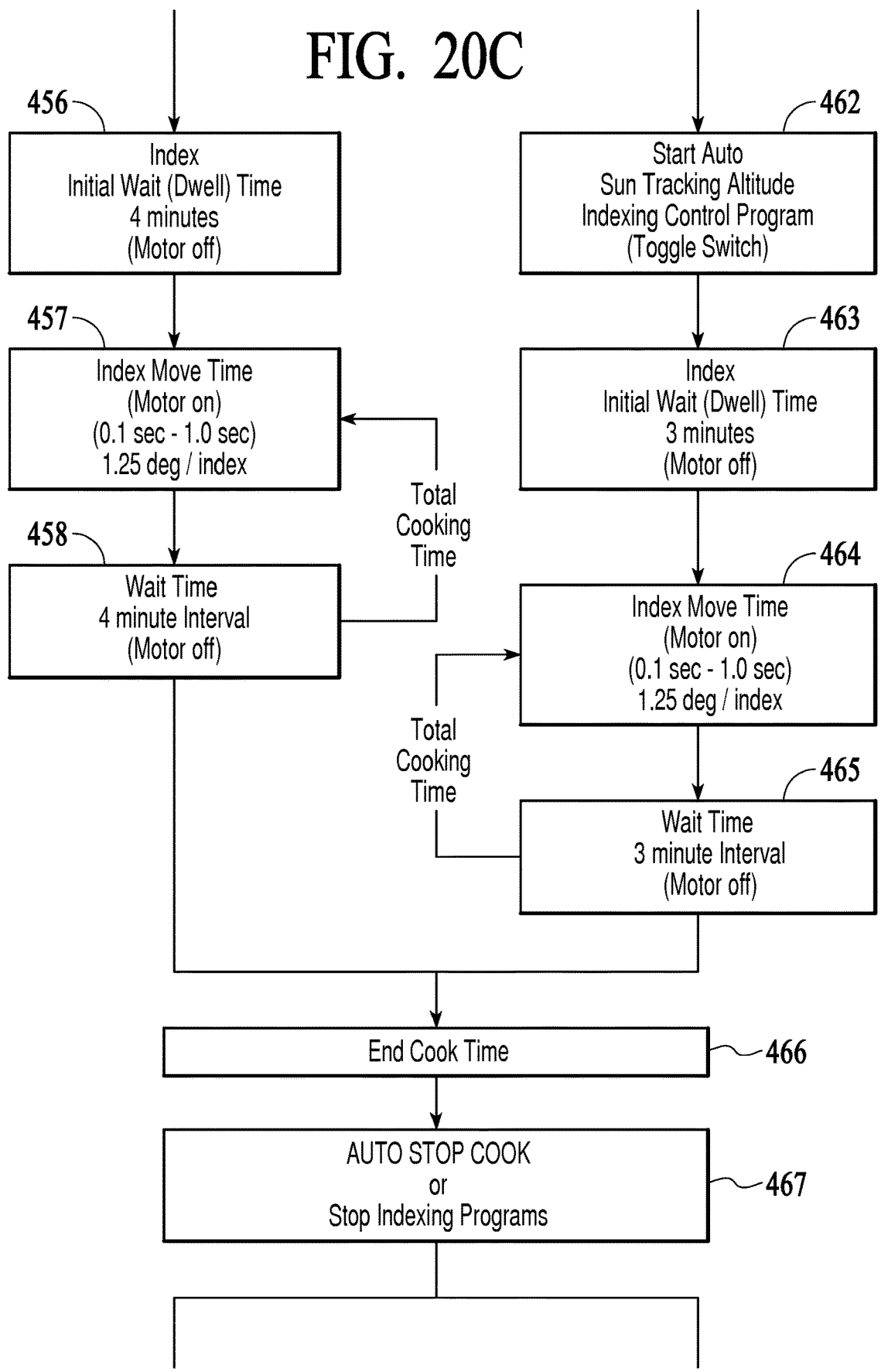

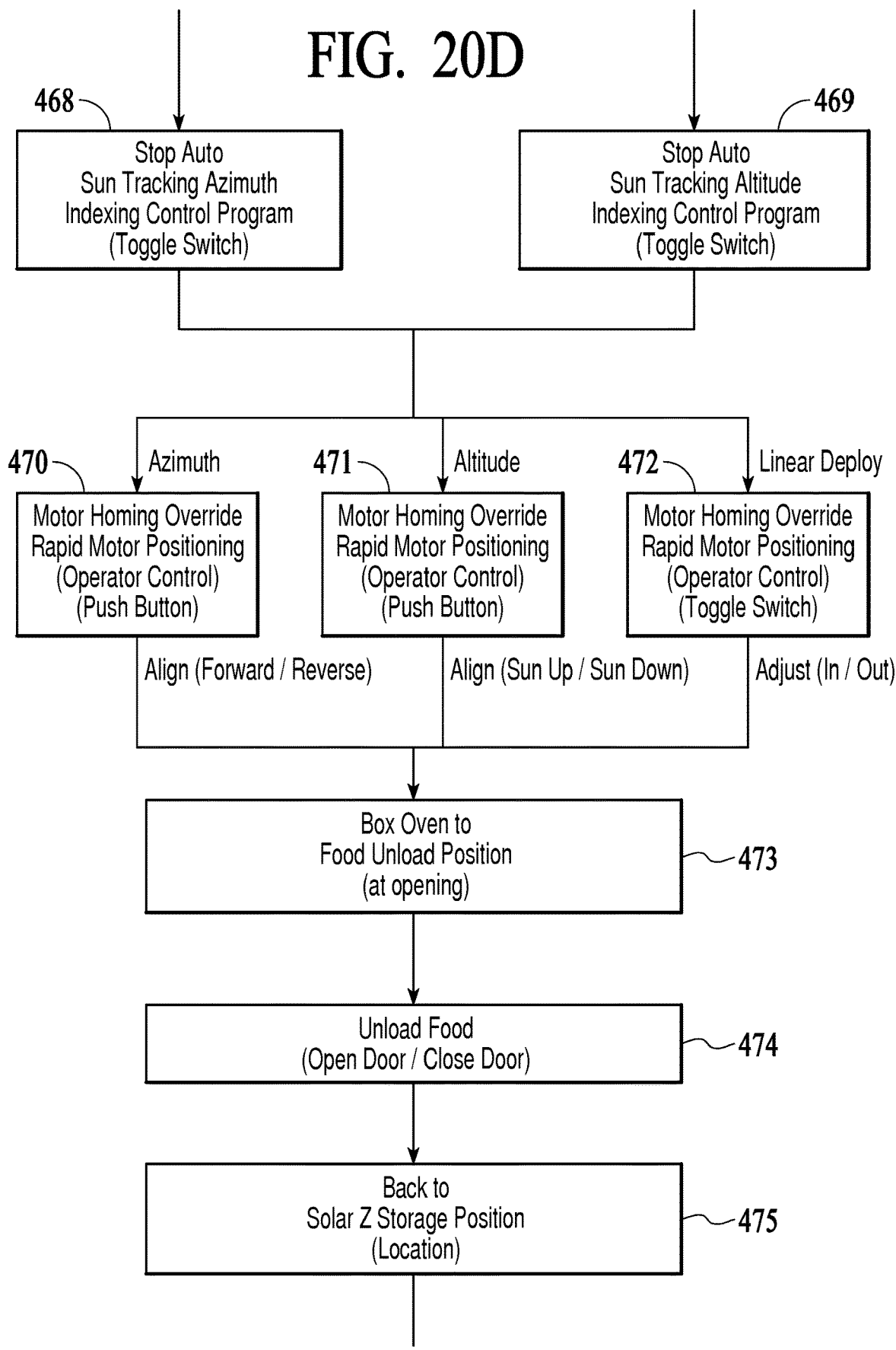

Summary
Solar Noon Clock Times
Average for Month
Santa Cruz, CA  Yr 2020 Table
(Calculated from Solar Noon Time Table)
Solar Noon (Solar Zenith Local Times, Santa Cruz, CA  USA

| SOLAR NOON Hrs Clock Time | | Range Max | Range Min | | |
|---|---|---|---|---|---|
| Mean Averages (12 Months) | | | | | |
| ST Avg  1210.8 | 1207 | 1221 | 1153 | 28 | Minutes |
| DST Avg 1306.6 | 1304 | 1315 | 1253 | 22 | Minutes |

Notes:
All data of each day for 12 months from Solar Noon clock time data sheet
ST = Standard Time
DST = Daylight Savings Time
* = Actual Clock Time Month Average
** = Calculation Conversion Time
7 Days March split between ST & DST accounts for difference
in average in approximation calculations (two different ways)

Solar Noon Clock Time

| Month | Time Change | Hrs (Avg) | Range (MIN - MAX) | | Direction (Chronological Time) | Sun Rise Earliest | Sun Set Latest | Day Light Span (Approx. Hrs) | |
|---|---|---|---|---|---|---|---|---|---|
| Jan | ST | 1217 | 1211 | 1221 | Min to Max | 711 | 1731 | 10.5 | Jan |
| Feb | ST | 1221 | 1220 | 1222 | Min to Max | 639 | 1802 | 11.5 | Feb |
| Mar | ST | 1219 | 1220 | 1218 | Max to Min (7 days) | 629 | 1808 | 11.5 | Mar |
| Mar | DST | 1315 | 1318 | 1312 | Max to Min (22 Days) | 654 | 1930 | 12.5 | Mar |
| Apr | DST | 1307 | 1311 | 1305 | Max to Min | 614 | 1956 | 14 | Apr |
| May | DST | 1304 | 1305 | 1305 | Max to Min | 550 | 2021 | 15 | May |
| Jun | DST | 1308 | 1306 | 1311 | Min to Max | 548 | 2031 | 14.5 | Jun |
| Jul | DST | 1313 | 1312 | 1314 | Min to Max | 552 | 2031 | 14.5 | Jul |
| Aug | DST | 1311 | 1314 | 1308 | Max to Min | 613 | 2014 | 14 | Aug |
| Sep | DST | 1302 | 1307 | 1257 | Max to Min | 639 | 1935 | 13 | Sep |
| Oct *1253 | DST | 1293 | 1257 | 1251 | Max to Min | 703 | 1841 | 14.5 | Oct |
| Nov *1153 | ST | 1193 | 1151 | 1157 | Min to Max | 632 | 1710 | 10.5 | Nov |
| Dec | ST | 1204 | 1157 | 1211 | Min to Max | 703 | 1701 | 10 | Dec |

FIG. 24

SOLAR OVEN POSITIONING

BACKGROUND

A solar oven uses the energy of direct sunlight to heat food or drink. Solar cooking is a form of outdoor cooking and is often used where it is desired to minimize fuel consumption. Use of solar ovens helps reduce fuel costs and air pollution. It can also help to slow down deforestation and desertification where the alternative is to use gathered firewood for cooking.

A solar oven produces heat by concentrating sunlight and converting the light to infrared heat. Typically, a reflective mirror of polished glass, metal metalized film concentrates light that then is used to produce heat from the sun. The heat is contained in a small cooking area. A solar oven makes efficient heat by the conversion of light to heat. This is done, for example, by using a black or other low reflectivity surface on cooking containers to create heat that is added and trapped in the cooking area.

The solar oven is positioned towards the sun in order to maximize heat generation. As the sun travels across the sky, the position of the solar oven can be adjusted to optimize position with respect to the sun and to avoid shadows. When the solar oven is to be used for several hours untended, the solar oven can be turned to face the zenith of the sun's path so as to optimize captured radiation during the day.

BRIEF DESCRIPTION OF THE DRAWINGS

FIG. 20A, FIG. 20B, FIG. 20C, FIG. 20D and FIG. 20E show a simplified flowchart showing cooking processing steps.

FIG. 24 is an example of a chart used to identify solar noon.

LIST OF REFERENCE NUMERALS

Figure 1:
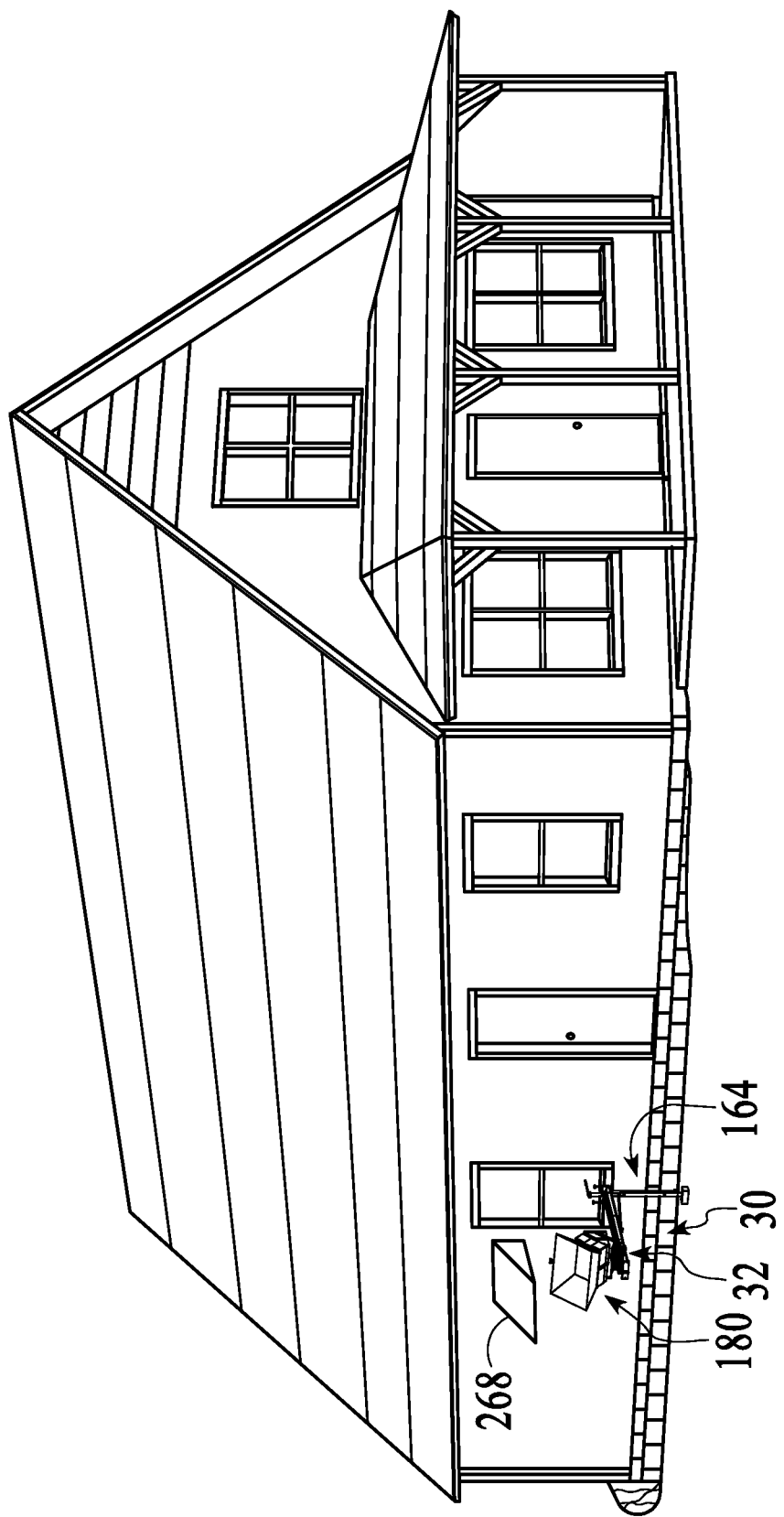
FIG. 1 is a perspective overall view of a solar oven system installed onto a building structure in accordance with an embodiment.

30 Solar Oven System
32 Extended Positioning System
34 Structural Extension Assembly
36 U-shaped Channel Rail Members (36R & 36 L)
38 Cross Members
40 Pivot Weldment
42 Vertical Pivoting Member
44 Horizontal Beam Supporting Member
46 Welded Stud
48 Beam Suspension Support Truss Assembly
50 Brace Bar
52 Brace Bar Attachment Bracket
54 Weldment Pivot Bearing Collar
56 Cable Drive Spool Collar
58 Moveable Carriage
60 Rollers & Carriage Retaining Assembly
62 Roller Bracket
64 Lateral Shafts & Rollers Assembly
66 Lateral Roller Shaft
68 Lateral Roller
70 Vertical Load Shafts, Bearing Rollers, & Collars Assembly
72 Vertical Load Shaft
74 Vertical Load Bearing Roller
76 Vertical Load Shaft Collar
78 Base plate Assembly
80 Base Plate
82 Nesting pins
84 Solar Altitude Cable Winch Assembly
86 Solar Altitude Worm Gear Drive Mechanism
88 Solar Altitude Worm
90 Solar Altitude Worm Gear
92 Solar Altitude Worm Gear Housing
94 Cable Winch Drum & Shaft Assembly
96 Cable Winch Shaft
98 Cable Winch Drum
100 Cable Winch Cable
102 Azimuth Bearing Drive Roller Assembly
104 Azimuth Worm Gear Drive Mechanism
106 Azimuth Worm
108 Azimuth Worm Gear 110 Azimuth Worm Gear Housing
112 Drive Roller & Drive Roller Shaft Assembly
114 Drive Roller Shaft
116 Drive Roller
118 Drive Roller Collar
120 Remote Control Mechanisms & Devices
122 Linear Hand Wheel
124 Cable Drive Spool
126 Cable Loop Pulley
128 Cable Loop Pulley Mount Plate Bracket
130 Carriage Drive Cable
132 Azimuth Hand Wheel & Hand Wheel Drive Shaft Assembly
134 Azimuth Hand Wheel
136 Azimuth Hand Wheel Drive Shaft
138 Azimuth Miter Gear Drive Shaft Bracket
140 Azimuth Miter Gears
142 Azimuth "D" Profile Drive Shaft
144 Solar Altitude Hand Wheel & Hand Wheel Drive Shaft Assembly
146 Solar Altitude Hand Wheel
148 Solar Altitude Hand Wheel Drive Shaft
150 Solar Altitude Miter Gear Drive Shaft Bracket
152 Solar Altitude Miter Gears
154 Solar Altitude "D" Profile Drive Shaft
156 Extendable Lever Handle
158 Access Knob Positioning Collar
160 Sliding Drive Block Pivot Yoke
162 Wrench drive plug
164 Wall Mount System
166 Pivot Post Saddle Weldment
168 "M" Shape Saddle
170 Saddle Top Retaining Stud
172 Saddle Bottom Retaining Bracket
174 Pivot Post
176 Pivot Post straps
178 Ground Foundation Block
180 Box Solar Oven Assembly
182 Insulated Foam Box
184 Foam Box Top
186 Foam Box Sides (186R & 186L)
188 Foam Box Bottom
192 Hoop Strap
194 Flange Bearings
196 Glazier
198 Glazier Spacer Frame
200 Glaser "L" Bracket Retaining Clips
202 Solar Collector Panel Mount Retainer & Insulating Enclosure Frame Assembly
204 Solar Collector Panel Mount Retainer & Insulating Enclosure Frame
208 Solar Collector Panels Assembly
210 Solar Collector panels
212 Cover Protector Assembly
214 Cover Protector
216 Solar Altitude Cable Attach Bracket
218 Door Assembly
220 Door
222 Door Handle
228 Yoke Member
230 Food Rack & Supports Assembly
234 Horizontal Pivot Bearing Bolt
236 Food Rack Side Plates
238 Food Rack Cross Rods
240 Food Rack Horizontal Plate
242 Azimuth Bearing & Pedestal Base Assembly
244 Azimuth 12 Inch Bearing Top Mount Plate
246 Azimuth 12 Inch Bearing Bottom Mount Plate
248 Pedestal Base
250 Azimuth 12 Inch Bearing
252 Center of Gravity Biaser Spring
254 Solar Altitude Locking Bar
256 Light Alignment Indicator Assembly
258 Tube Scope Box mounting bracket
260 Light Indicator Tube
262 Translucent Light Target Assembly
264 Translucent Target
266 Target Mounting bracket
268 Protective storage shelter cover
270 Azimuth Servomotor
272 Azimuth Servomotor Mount Bracket
274 Solar Altitude Servomotor
276 Solar Altitude Servomotor Mount Bracket
278 Feedback Light Sensor Unit
280 Azimuth Servo Drive Coupling
282 Solar Altitude Servo Drive Coupling
284 Solar Tracking Controller
300 Solar Oven System
308 Box Solar Oven Assembly
310 Solar Collector Panels Assembly
332 Extended Positioning System
334 Structural Extension Assembly
374 Pivot Post
378 Ground Foundation Block
400 Controller System
401 Solar Altitude Electric Motor
402 Linear Deploy Electric Motor
403 Solar Azimuth Electric Motor
411 Solar Altitude Override Handle
412 Linear Deploy Override Handle
413 Solar Azimuth Override Handle
414 Linear Deploy Lead Screw
420 Transformer
421 Timer
422 Timer
423 Override button Switch
424 Arrow
425 Timer
426 Override button Switch
427 Arrow
428 Timer
429 Directional Power Switch
430 Arrow
442-481 Logic Blocks
501 Kitchen Window
502 Casing
503 Power Cord
504 Connector Cable
522 Power Switch
523 Unit Power light
524 Switch
525 Time Delay relay
526 Time Delay relay
527 Time Delay relay
528 Switch
529 Time Delay relay
530 Sun Track indicator light
531 Time Delay relay Switch
532 Time Delay relay Switch
533 Time Delay relay Switch
534 Time Delay relay Switch
541 DPDT Toggle Switch
542 Cross wired relay Switch
547 DPDT Toggle Switch

DETAILED DESCRIPTION

A solar oven system is installed on an outside wall of a building structure outside the cooking area and accessed through a window or other opening accessible from within the cooking area with the apparatus reaching out away from the building structure into the outside environment when operated. The solar oven system integrates all of the needed solutions of the various operation process steps and numerous problems related to the requirements of the entire solar cooking process into one complete seamless cohesive operation.

Figure 2:
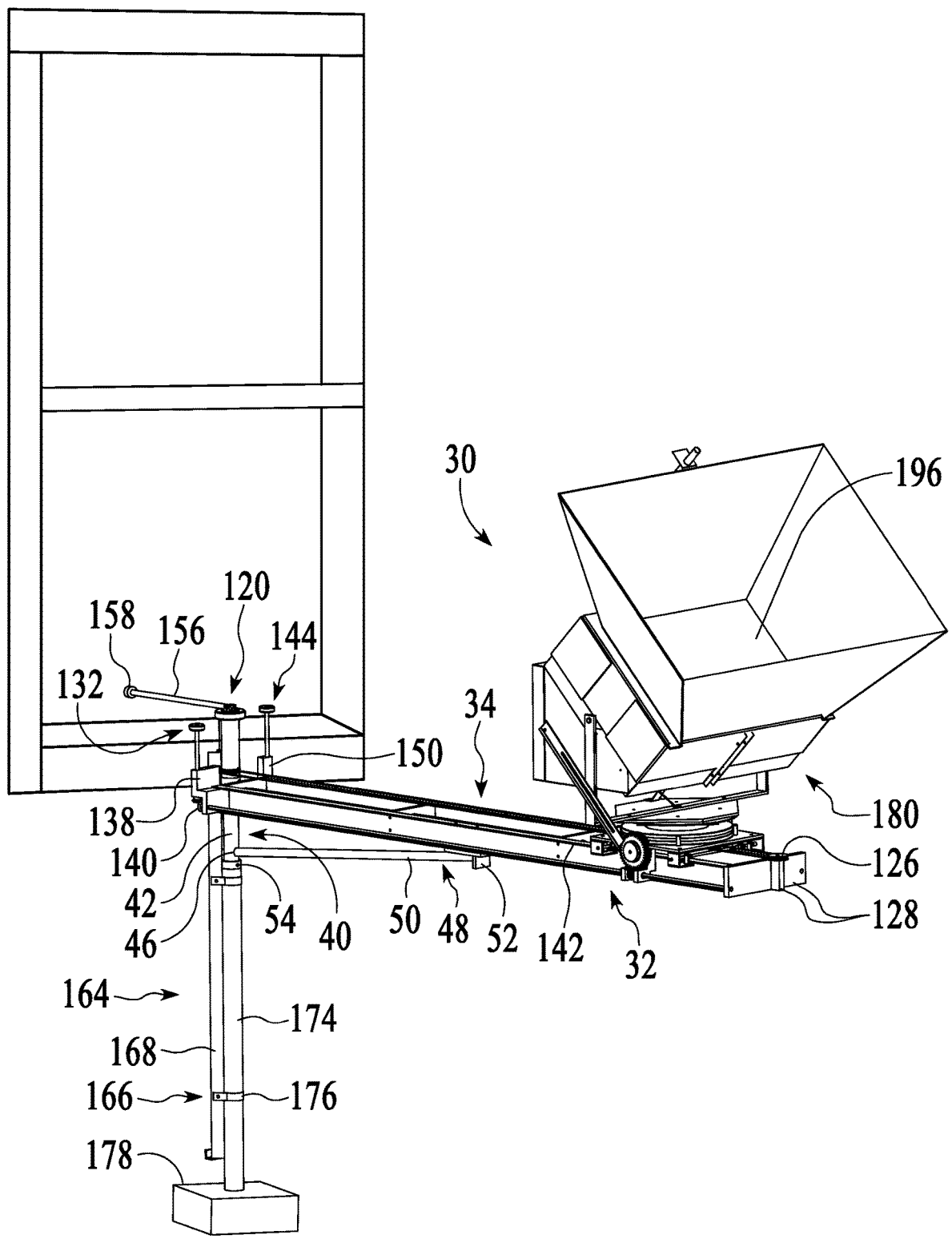
FIG. 2 is a front perspective view, from outside of a building, of a solar oven system installed on a building structure at a window opening in accordance with an embodiment.

FIG. 1 and FIG. 2, of the solar oven system 30 shows a basic version of a solar oven system embodiment installed onto a building structure. A solar oven system 30 includes an extended positioning system 32 and a radiation collection device. For example, the radiation collection system is represented in FIGS. 1 and 2 by a box solar oven assembly 180. Box solar oven assembly 180 is used for converting solar energy into heat for cooking food or other solar processes. Positioning system 32 is used to deploy, and align box solar oven assembly 180.

The extended positioning system 32 is installed, mounted, or connected onto the wall by features in FIGS. 3, 4, 5, & 10 with a saddle top retaining stud 170, saddle bottom retaining bracket 172, and a ground foundation block 178. A wall mount system 164 includes a pivot post saddle weldment 166, of which includes an M-shape saddle 168 (FIG. 10) to nest a pivot post 174, saddle top retaining stud 170 for top attachment to the building structure, and a saddle bottom retaining bracket 172 for the bottom attachment to the building structure. The wall mount system 164 also includes a pivot post 174 for receiving a pivot weldment 40, two pivot post straps 176 to secure and adjust the pivot post into a pivot post saddle weldment 166, and a ground foundation block 178 to support the vertical component force loads of an embodiment itself and its process operation loads.

The saddle top retaining stud 170 is inserted into a hole located in the underside of the exterior lower horizontal window frame material or is already provided by the existing vertical grooves in the building siding material, (such as "T111 and other siding materials with vertical groove features) when the lower horizontal window frame material is mounted over the grooves which then provides a hole feature which can be used as the retaining hole to secure the upper portion of the wall mount system. The saddle bottom retaining bracket 172 slides behind and onto the lower edge of the building siding material between the vertical flange of the saddle bottom retaining bracket 172 and the M-shape saddle 168 mounting surface therefore retaining the lower portion of the wall mount onto the wall material. The M-shape saddle 168 is configured to provide the center portion of the design to protrude out beyond the outer edges or general surface plane of the wall mounting surface of the M-shape saddle 168 therefore providing insertion of the M-shape saddle 168 center material protruding into the siding vertical groove for preventing twisting after mounting and adding strength and retention of the system in any position after installation. The ground foundation block 178 supports the entire vertical component load force vector after adjusting and setting of the installation to the wall. This design removes (or prevents) the vertical load force component vector from the installed pivot post saddle weldment 166 and keeps the wall mount system 164 from disengaging vertically downward. It does this by first redirecting all the vertical load force directly down onto the ground providing for a load path which provides no unnecessary vertical force on wall mount weldment 166, therefore, not requiring additional fastening methods in order to retain the wall mount weldment 166 vertically onto the building structure. The pivot post straps 176, after installed and setup, only provide retaining of the pivot post 174 into the pivot post saddle weldment 166 in the horizontal component force vector loading directions.

Figure 4:
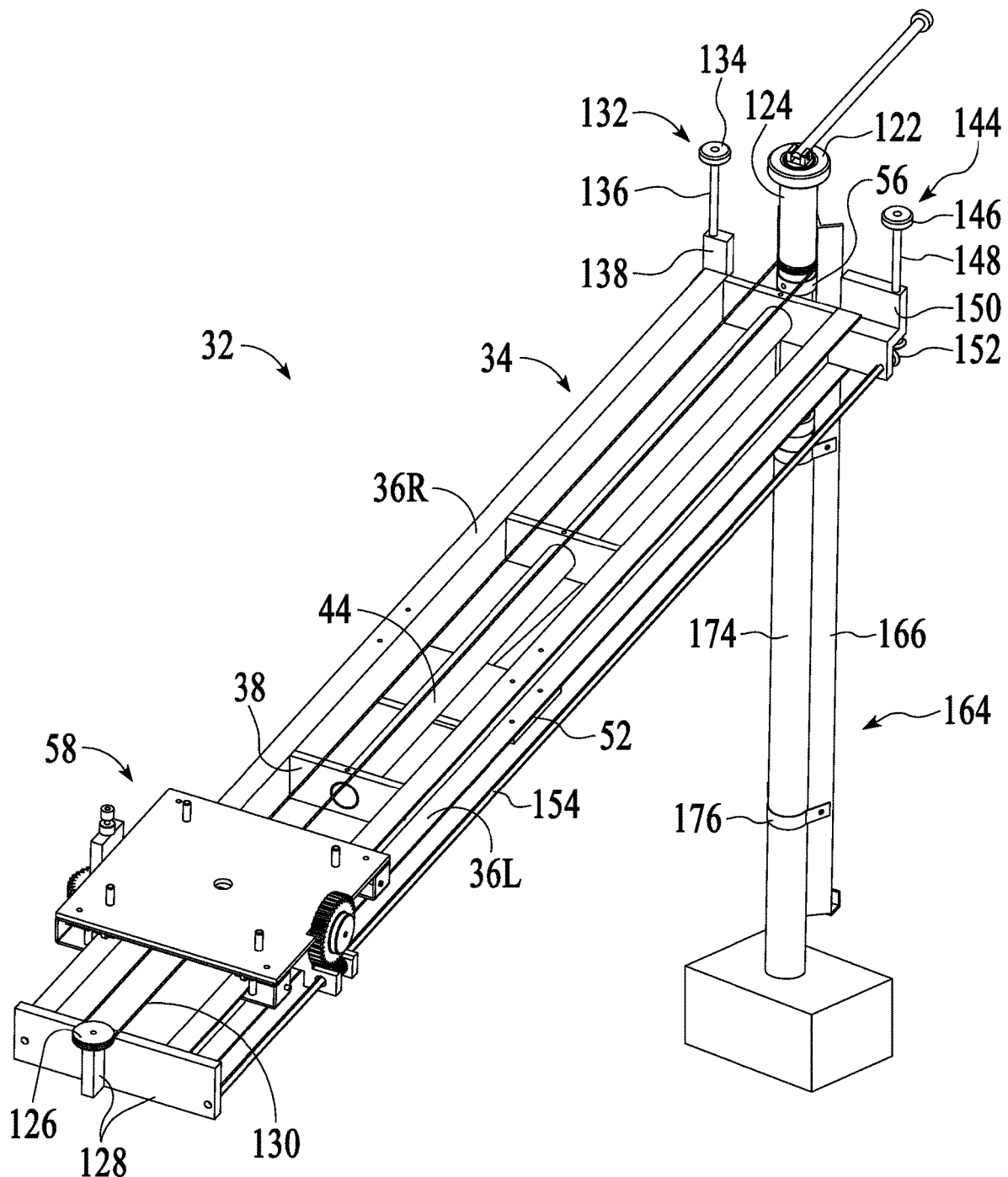
FIG. 4 is a perspective view of an extended positioning system in accordance with an embodiment.

The wall mount system 164 is installed on to the wall by inserting and sliding the pivot post saddle weldment 166 into the groove of the siding material and simultaneously sliding up and in both the saddle top retaining stud 170 along with the saddle bottom retaining bracket 172 simultaneously into their proper securing locations on the wall as previously described above. The pivot post 174 is then inserted into the "M" shape saddle 168 nesting feature as shown in FIG. 4 with the two pivot post straps 176 while loading a downward vertical force of the pivot post 174 onto the ground foundation block 178 before tightening the two pivot post straps 176 in place. As stated above, this design and setup prevents the vertical load force from siding out the upper and lower retaining features of the previously described pivot post saddle weldment 166. No fasteners are required to make the secure installation to the building wall because of this vertical load path design directing to the ground foundation block 178 first, which again, prevents sliding out of the weldment 166 retaining features.

Figure 5:
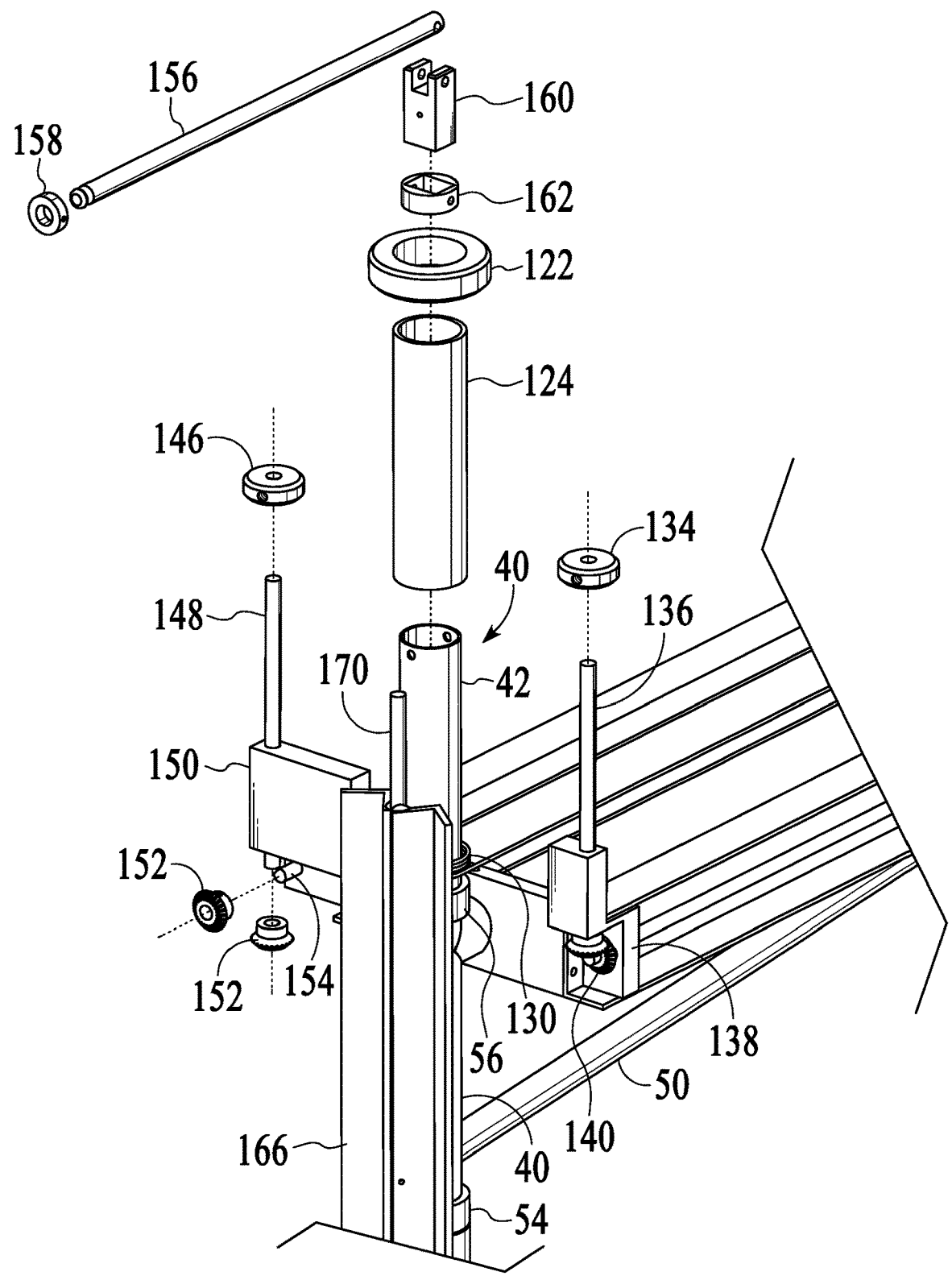
FIG. 5 is an exploded partial view of remote control elements and other extended positioning system features including a wall mount weldment.

Extended positioning system 32 in FIGS. 2, 4, and 5 includes a structural extension assembly 34 that provides linear extension and manipulation of the box solar oven assembly 180 out away from the building structure. The structural extension 34 includes two U-shape channel rail members 36R and 36L connected together by cross members 38 assembled by screws, welds or other standard structural attachment methods. Referring to FIG. 4, the cross members 38 have a hole in the center with set screws at the plate edge in order to receive and secure for attachment a horizontal beam supporting member 44 of a pivot weldment 40.

The pivot weldment 40 includes a vertical pivoting member 42 including a feature of a welded stud 46 for brace bar 50 attachment for structural support and a horizontal beam supporting member 44 which provides pivoting attachment of the structural extension 34 to the wall mount system 164. Set screws provided in the structural extension 34 cross members 38 are used to secure to the horizontal beam supporting member 44. A lower portion of the vertical pivoting member 42 of the pivot weldment 40 is then slip fit into the top of the pivot post 174 in FIGS. 2 and 4 to allow pivoting (angular rotation) of the structural extension 34 using an extendable lever handle 156 by the operator. A beam suspension support truss assembly 48, made up of the brace bar 50 and a brace bar attachment bracket 52 attached with screws or other methods to the structural extension 34 provides structural strength required to significantly extend and support operational load weights during operations.

Figure 6:
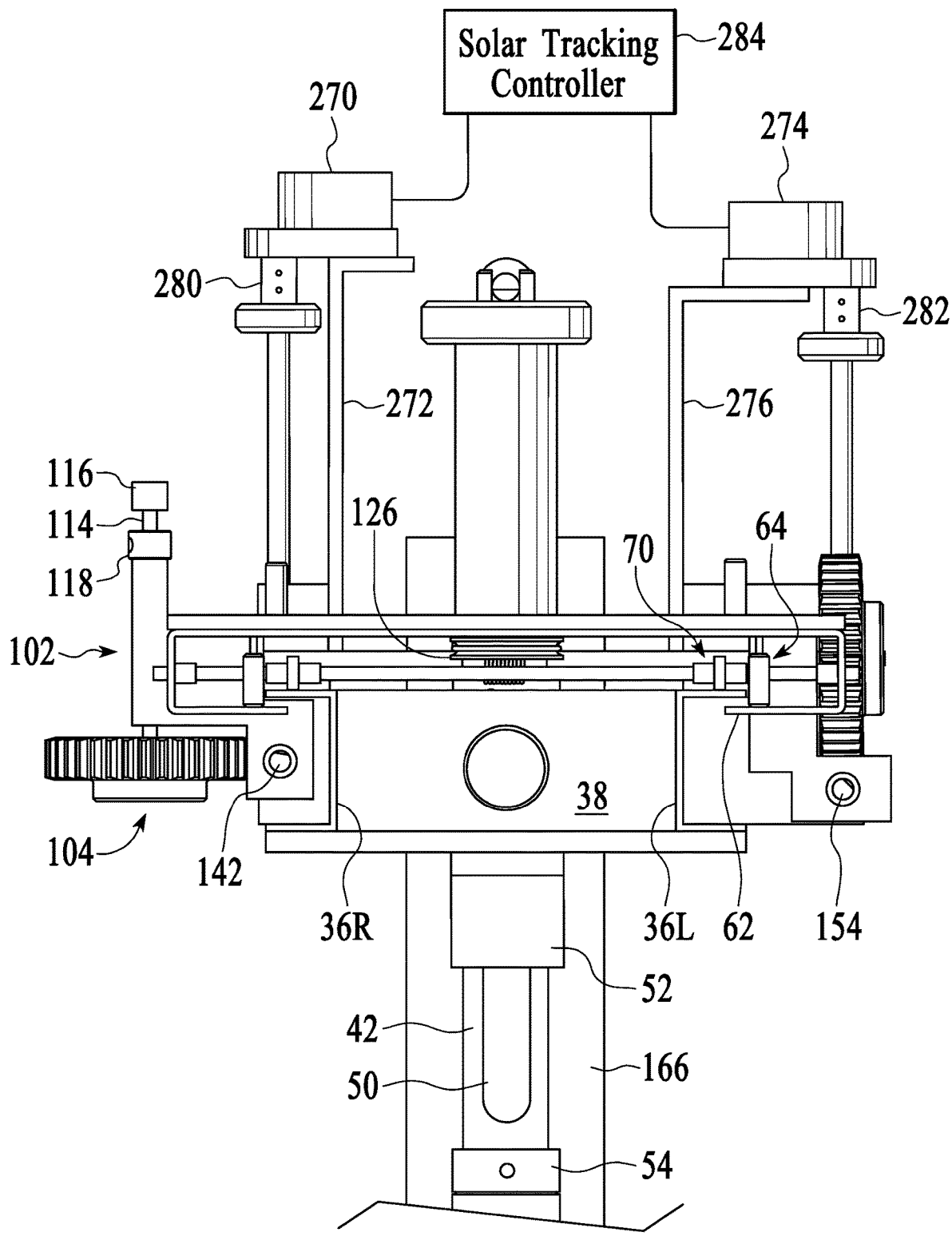
FIG. 6 is an end view of an upper portion of an extended positioning system structural extension assembly showing a movable carriage connected to the structural extension assembly.
Figure 7:
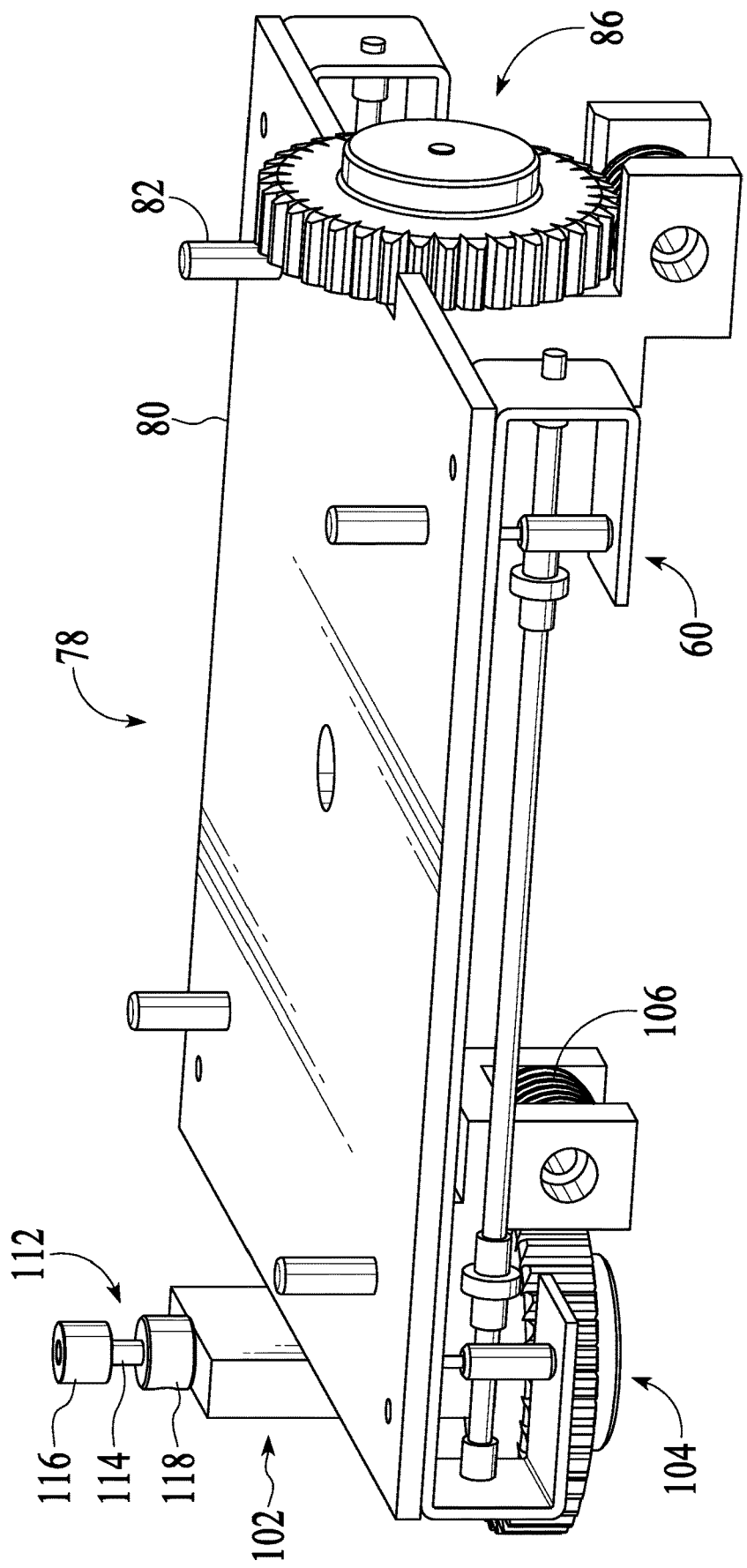
FIG. 7 is a front and top perspective view of a moveable carriage assembly.
Figure 9:
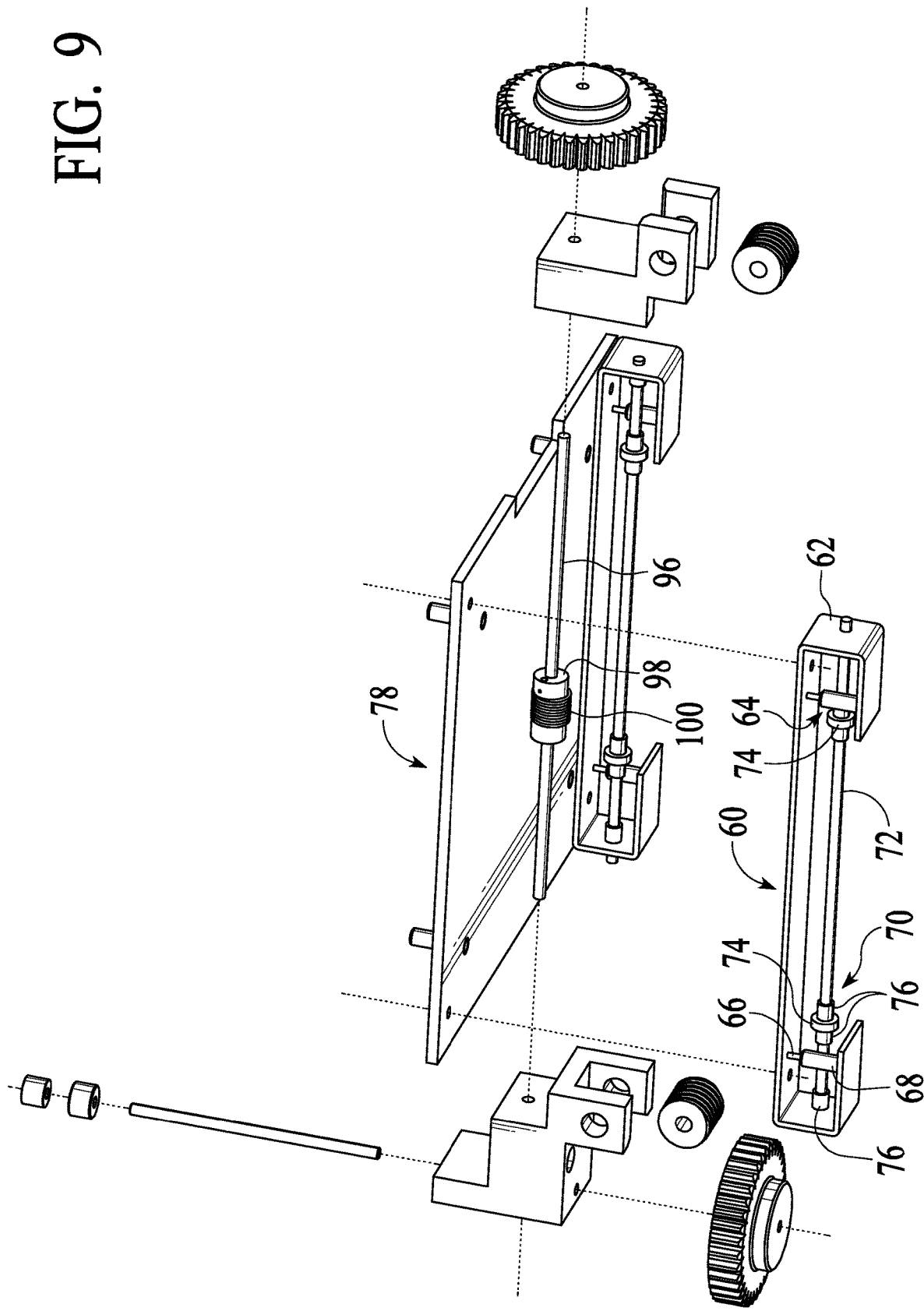
FIG. 9 is a bottom exploded perspective view of a moveable carriage assembly and its features.
Figure 10:
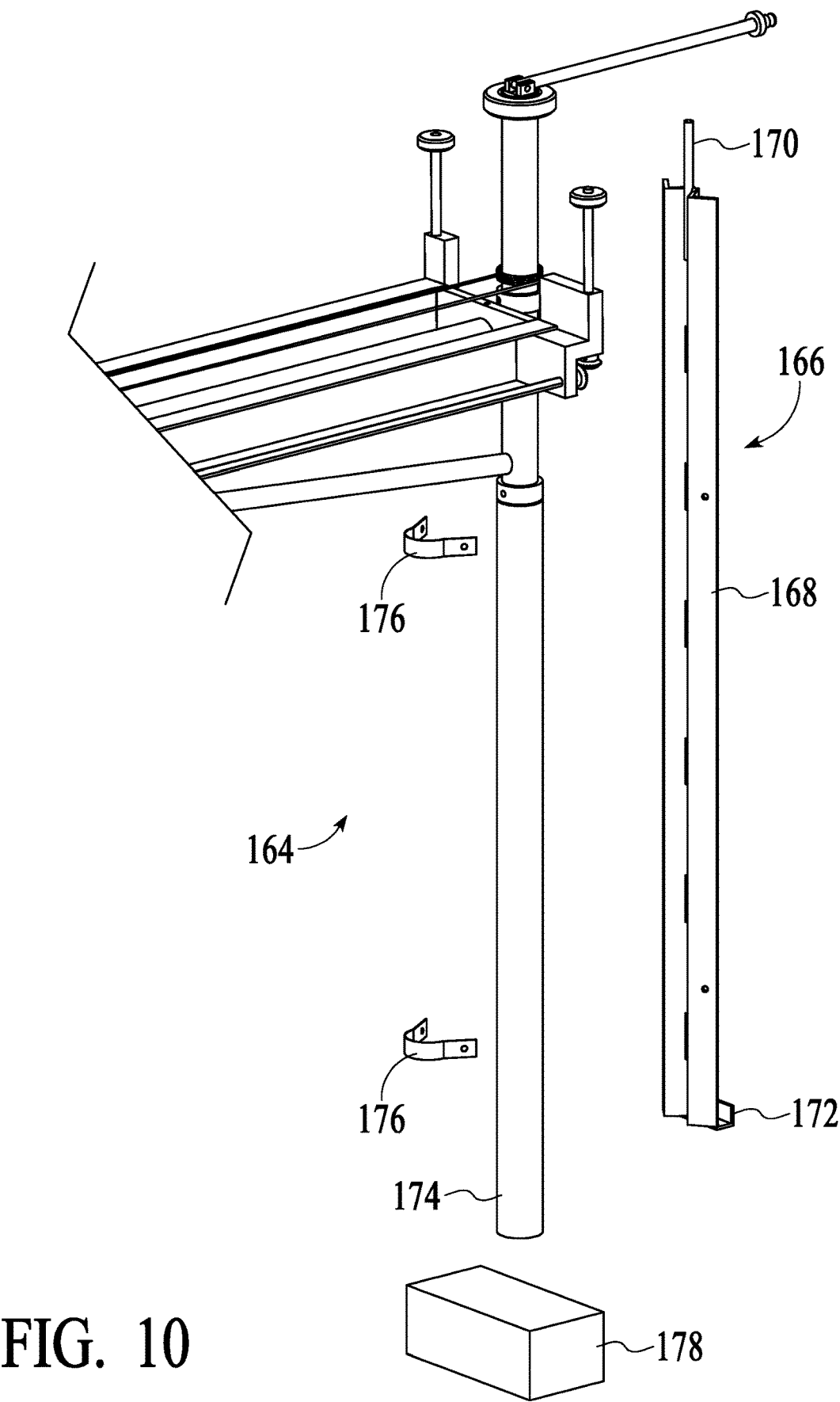
FIG. 10 is a partial exploded view of an extended positioning system showing a wall mount system.

Referring to FIGS. 4, 6, and 9, a moveable carriage 58 slides or rolls along the structural extension assembly 34 in a linear movement on vertical load shafts, bearing rollers, and collars assembly 70 to carry (or roll) the box solar oven assembly 180 into optimum locations for operating an embodiment. The moveable carriage 58 is attached to the structural extension assembly 34 by four lateral shafts and rollers assemblies 64 in FIGS. 6 and 9, which keeps the moveable carriage aligned and trapped to prevent any side derailment. Moveable carriage 58 also has two roller brackets 62 with material extending under the U-shaped channel members 36R and 36L flanges in FIG. 6 for interference between channel members flanges and roller brackets 62 when a vertical ascending movement is applied. This prevents upward disengagement from the structural extension assembly 34. These features keep the moveable carriage 58 from being lifted or removed from the structural extension assembly 34 while allowing only a longitudinal degree of freedom movement (linear) of the moveable carriage 58 along the length of the structural extension assembly 34. Further, the moveable carriage 58 is prevented from rolling or sliding off the end of the structural extension assembly 34 by a cable loop pulley mount plate bracket 128, therefore securely trapping the moveable carriage 58 (during assembly) onto the structural extension 34 while in operation.

The moveable carriage 58 in FIGS. 4, 6, 7, 8, and 9 includes a base plate assembly 78 made up of a structural base plate 80 with nesting pins 82 threaded (with machine nuts) or other methods of securing, positioning, and attaching a pedestal base 248 (FIG. 12) of the box solar oven assembly 180 onto the extended positioning system 32 in FIG. 2. Two rollers and carriage retaining assemblies 60 attach to the underside of base plate 80 with screws or a like standard attachment to create the carriage movement mechanism. It provides vertical load shafts 72, and vertical load bearing rollers 74, with rubber press fit retaining vertical load shaft collars 76, for moving or driving the carriage along the structural extension assembly 34. Carriage retaining assembly 60 provides for lateral control using lateral shafts and rollers assembly 64 with lateral roller shaft 66 and lateral rollers 68 guiding the carriage with the edges (FIG. 6) of the U-Shaped channel members 36R and 36L to prevent derailment. Vertical load shafts, bearing rollers, and collars assemblies 70 carry the box solar oven assembly 180 weight along the structural extension assembly 34. The roller bracket 62 is sized and configured to provide interference with the U-shaped channel rail members 36R and 36L as stated earlier to prevent detachment and removal from the structural extension assembly 34.

Referring to FIGS. 2, 3, 11, 12, and 13 the box solar oven assembly 180 includes an insulated assembled foam box 182 (FIG. 13) which includes a foam box top 184, foam box sides 186R and 186L with clearance holes for the stationary horizontal pivot bearing bolts 234 supported by a yoke member 228, and a foam box bottom 188 assembled at all the corner joints with long wood screws or other suitable connecting methods. The foam material used is rigid polyisocyanurate Aluminum foil faced foam board used in building construction. Energy Shield® by Atlas Roofing Corporation®, or Thermasheath and TSX 100 and 200, by Rmax Inc., or other standard building foam with two-sided foil can be used for the insulated foam box 182 structure. It can be any standard thickness 1.5 inches or greater.

A formed sheet metal hoop strap 192 assembles around (slides onto) the foam box main body area and is then secured by tightening the two screws at a hoop clamp opening (FIG. 2 under bottom collector panel). The clamping system includes two parallel flanges bent 90 degrees outward at each end of the hoop strap material with two clearance holes with screws in each for tightening the clamp together. The clamping system is tightened until it cinches (clamps) tight therefore providing a hoop stress compression force strength around the entire main body of the insulated foam box structure. This hoop strap 192 provides a significant strength improvement to the foam box structure 182 without adding excessive weight or requiring other less desirable methods for structural integrity and strength. There are two holes located in the hoop strap 192 for flange bearings 194 (FIG. 13) to be inserted which are for rotating the box solar oven 180 (FIG. 12) on the stationary horizontal pivot bearing bolts 234 supported by the yoke member 228. The hoop strap 192 depth is larger (wider) than the top width of the foam box top 184 therefore creating a recessed well at the front glazier opening having a depth of the thickness of the stacked two glaziers 196 of clear plate glass or equivalent with the glazier spacer frame 198 in between. This recessed well provides for insertion, at the front of the insulated foam box 182 edge face, for secure placement in two degrees of freedom of the inner and outer glaziers 196 and glazier spacer frame 198 assemblage. A tight seal for heat retention of the inner glazier 196 to the foam box edge along with the glazier spacer frame 198 between both the inner and outer glaziers 196 is made with a solar collector panel mount retainer and insulating enclosure frame assembly 202 (FIG. 13) by using a solar collector panel mount retainer and insulating enclosure frame 204, which retains and traps the glazier system securely and tightly in place down into the recess well and onto the foam surface when slid on over the hoop strap's 192 outer surface down to the outer glazier surface. The insulating enclosure frame 204 is then secured with sheet metal screws (not shown) into the hoop strap 192 on both side ends. A solar collector panels assembly 208 made up of solar collector panels 210 segments is assembled by inserting the lower flanges of the solar collector panels 210 under the solar collector panel mount retainer and insulating enclosure frame 204 opening flanges before assembling the insulating enclosure frame assembly 202 onto the hoop strap 192. The solar collector panel mount retainer and insulating enclosure frame 204 after attachment, is what holds the glazier and solar collector panel systems securely in place by using the hoop strap 192 main structure.

A formed sheet metal cover protector assembly 212 provides exterior protection of the foam material not covered by the hoop strap 192. A cover protector 214 is inserted onto the insulated foam box 182 with its sides passing over the hoop strap 192 material and when in position the cover protector 214 is then secured with sheet metal screws (not shown) into each side to the hoop strap 192 structure. A door assembly 218 slides into the rear opening of the insulated foam box snugly with a degree of interference for heat retention using a door handle 222. An added appropriate surface of plastic or other suitable material (not shown) can be inserted into the assembled foam box 182 on the foam/foil surfaces if desired to protect and insulate to facilitate and accommodate operation wear and cleaning.

Figure 3:
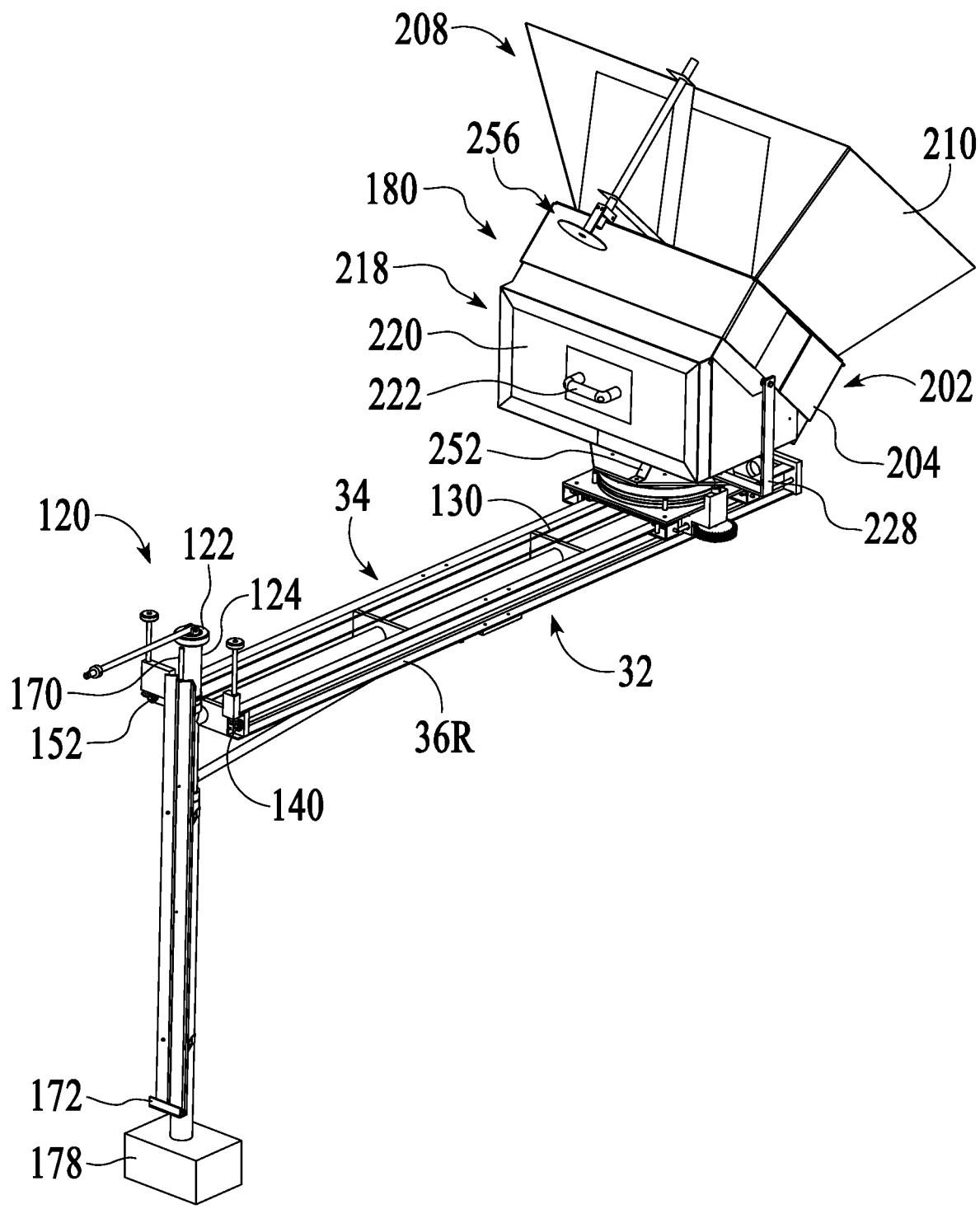
FIG. 3 is a rear perspective view of the solar oven system in accordance with an embodiment.
Figure 11:
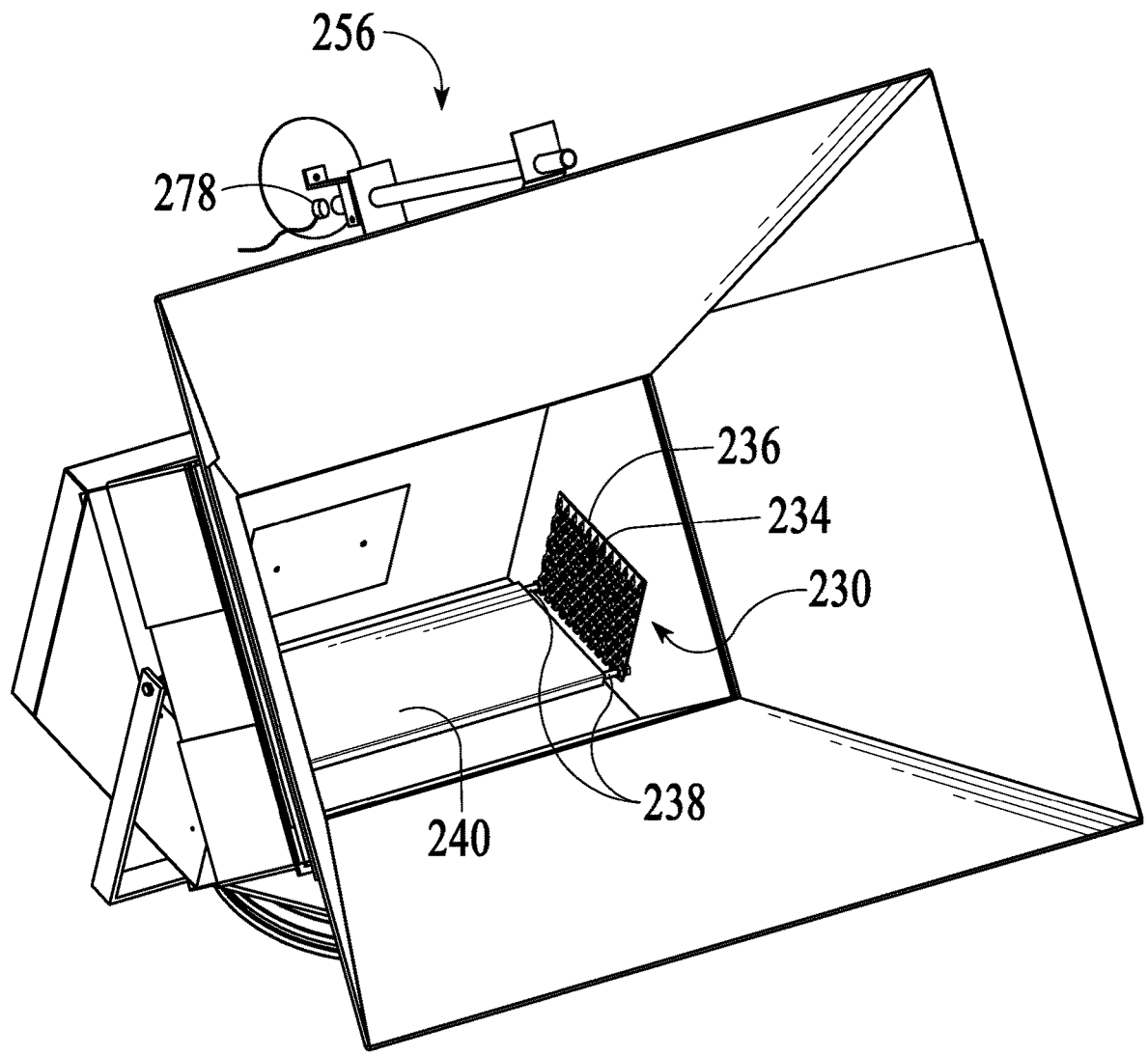
FIG. 11 is a front perspective view without glaziers of a box solar oven assembly in accordance with an embodiment inside an oven area including a food rack and supports assembly.
Figure 13:
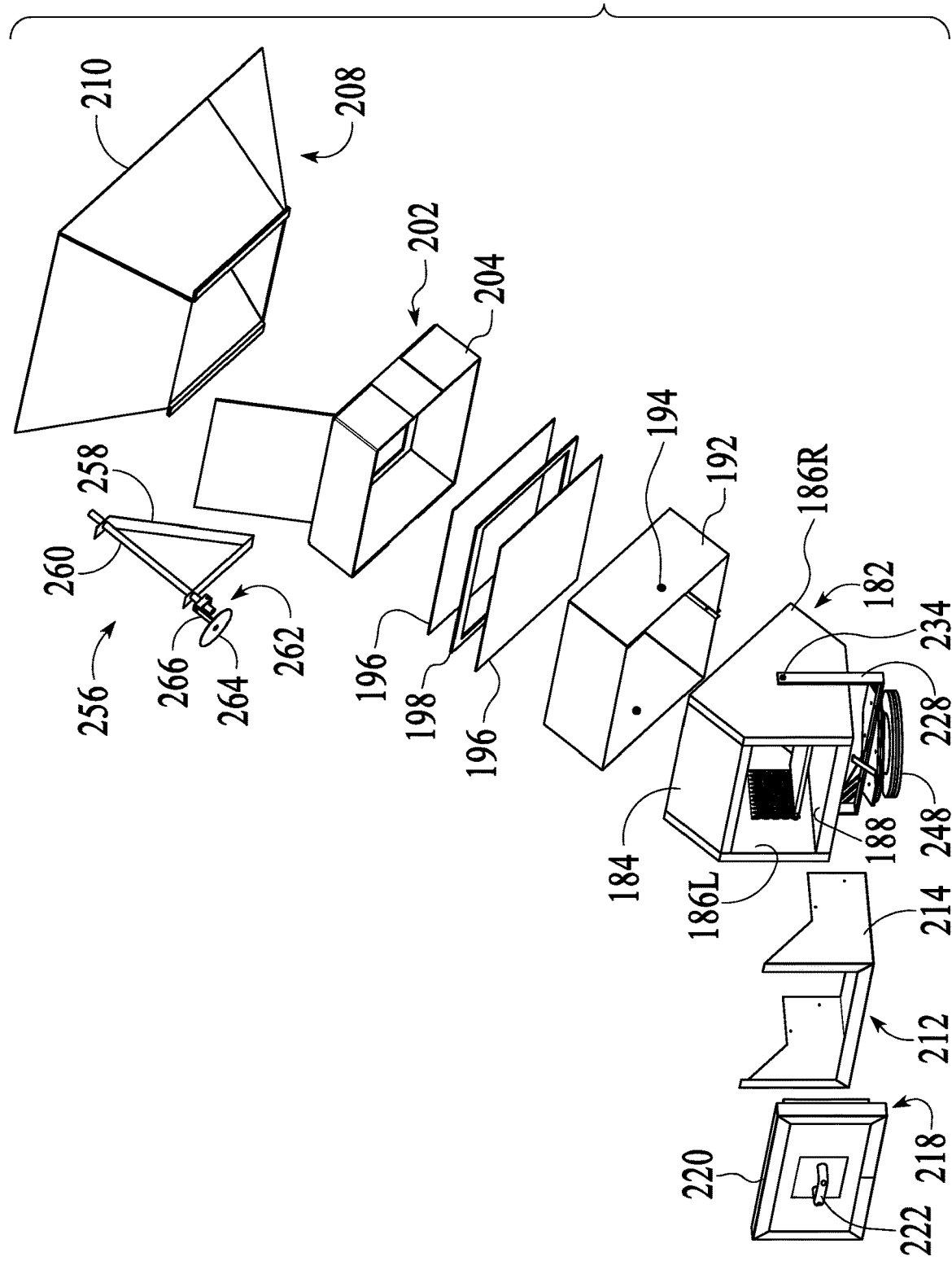
FIG. 13 is a partial exploded view of a box solar oven assembly side view without exploding an azimuth bearing and pedestal base assembly.

Referring to FIGS. 3, 11, and 13, A light alignment indicator assembly 256 is used to indicate azimuth and solar altitude alignment of the box solar oven assembly 180 with respect to the related perpendicularity of the glazier surface to the sun's incoming rays. It includes a tube scope box mounting bracket 258 which positions and mounts a light indicator tube 260 attached with clamping collars (not shown) or other method around the tube at the mounting bracket surfaces with the light indicator tube 260 positioned perpendicular to the glazier surface in two directions. A translucent light target assembly 262 provides for a translucent target 264 to be parallel and away from the tube 260 end plane FIG. 13). The translucent light target assembly 262 includes a clamp type target mounting bracket 266 which connects or clamps onto the light indicator tube 260 extending past the light indicator tube 260 end to position the translucent target 264 parallel and away from the tube 260 end plane needed for projecting the sun rays (light beam) out of the tube onto the translucent target 264 for visual reading on either surface of the target material (front or back). The light alignment indicator assembly 256 is attached with the tube scope mounting bracket 258 into the box solar oven assembly 180 solar collector panel mount retainer and insulating enclosure frame assembly 202 with screws.

Figure 12:
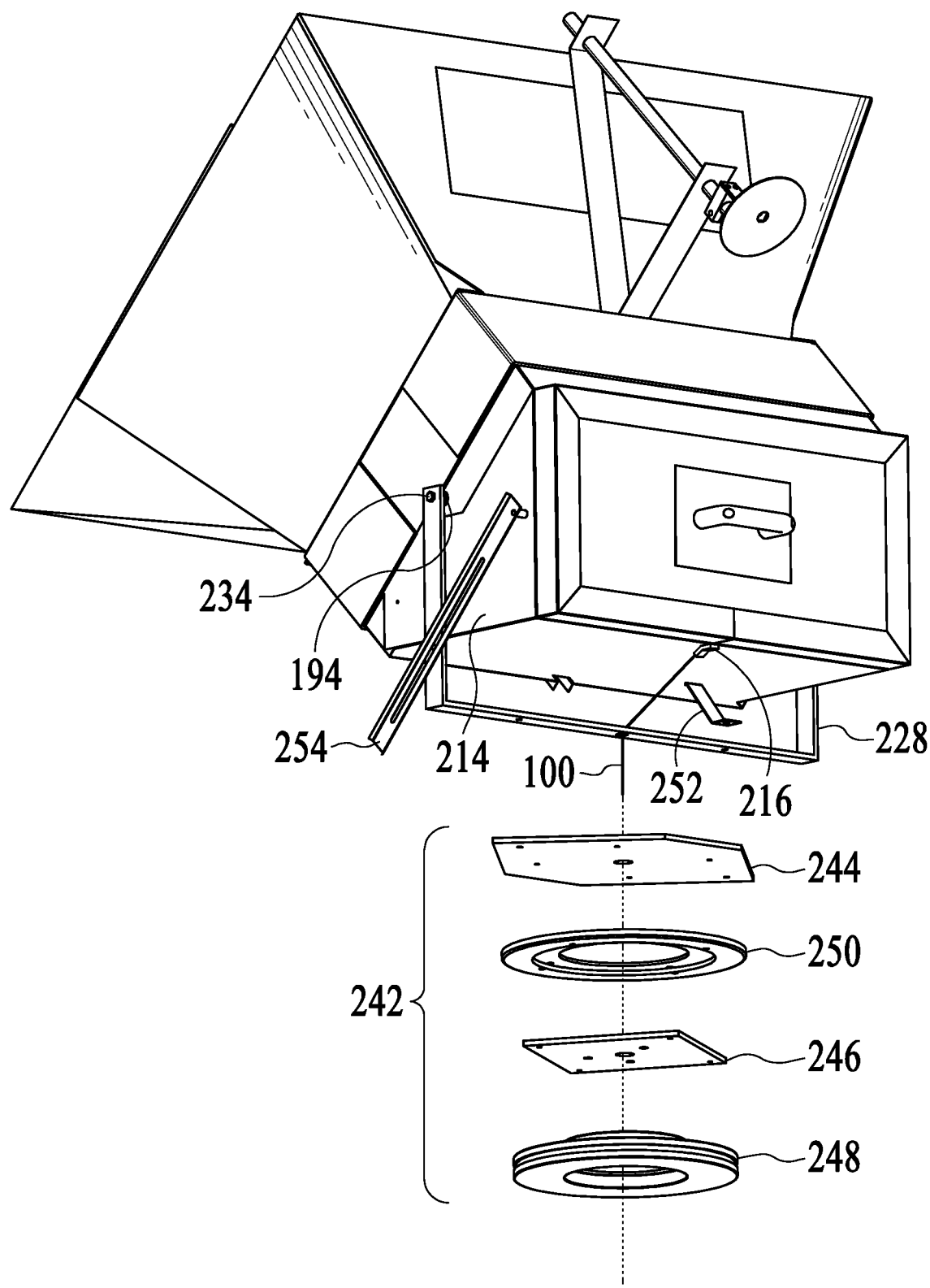
FIG. 12 is a rear-view perspective of a box solar oven assembly with an azimuth bearing and pedestal base assembly exploded in this view in accordance with an embodiment.

Referring to FIG. 12, an azimuth bearing and pedestal base assembly 242 for positioning and rotating the box solar oven assembly 180 includes a pedestal base 248 providing a stable ballast stand frame structure screwed or connected by other standard methods to an azimuth 12 inch bearing bottom mount plate 246, then is connected to an azimuth 12 inch bearing 250, which is then mounted to an azimuth 12 inch bearing top mount plate 244 which provides a mounting surface to connect to the yoke member 228. A center of gravity biaser spring 252, screwed and mounted to the plate 244 surface is provided to keep a solar altitude cable winch cable 100 tight at all times and therefore fully operational at any position in the 90-degree rotation range. The center of gravity biaser spring 252 is designed to keep a constant force or biased push on the box solar oven assembly 180 in one direction throughout the entire adjustment range, thereby eliminating a characteristic reverse rotating reaction caused by a change in the center of gravity moment due to the unique box solar oven 180 design shape.

A solar altitude locking bar 254 in FIG. 12 is connected with a pivoting screw at one end onto the box solar oven assembly 180 and to the yoke member 228 with its adjusting slot. This provides for solar altitude locking bar 254 being able to slide in a long slot at the yoke member 228 when the box solar oven assembly 180 is rotated. By tightening a locking finger screw (not shown) in the long bar slot at the yoke member 228, a clamping action of the bar to the yoke member occurs, therefore locking the box solar oven assembly 180 into a set position. This is used for manually locking the rotating altitude position when needed during manual operations, handling, or maintenance.

FIG. 11 shows a food rack and supports assembly 230 inside the box solar oven assembly 180. The food rack and supports assembly 230 includes two horizontal pivot bearing bolts 234 supported by the yoke member 228 (FIG. 12) as discussed earlier. These bolts are mounted stationary to the yoke member 228 with machine nuts and protrude through the flange bearing assembly and out into the box solar oven assembly 180 cooking or heating interior compartment for assembling the food rack and supports assembly 230. Two food rack side plates 236 are rigidly connected with machine nuts to the two horizontal pivot bearing bolts 234. Two food rack cross rods 238 are rigidly connected with machine nuts at each corner of the lower portion of two food rack side plates 236. A food rack horizontal plate 240 then sits on top the two food rack cross rods 238 maintaining its position vertically by its own weight. The food rack horizontal plate 240 has the two longitudinal side edges bent 90 degrees down or can have four leg type features extending or protruding from the bottom surface of the plate for trapping the plate itself onto (straddling) the two food rack cross rods 238 when in operation. Horizontal plate 240 is trapped (secured) between the two food rack side plates 236 and each of the outer diameter sides of the two food rack cross rods 238.

Referring to FIGS. 2, 3, 4 and 5, the extended positioning system 32 includes a remote-control mechanism and devices 120 (FIG. 2). Remote control mechanism and devices 120 is designed to operate for position, adjusting, and solar alignment in any infinite continuous location or position along the extended positioning system 32 with the operator located within the building structure.

A linear positioning mechanism used to position the box solar oven assembly 180 along the extended positioning system 32 includes and referring to FIGS. 3, 4 and 5, is a linear hand wheel 122 attached with a set screw or other standard method to a cable drive spool 124 which is then slip fit over the vertical pivoting member 42 for rotation of the cable drive spool 124 when in use. A cable drive spool collar 56 attached with a retaining screw to the vertical pivoting member 42 provides a thrust bearing surface for the turning spool 124 to run and slide on thereby reducing friction when rotating while also simultaneously setting the position of cable drive spool 124 on the assembly. A carriage drive cable 130 wraps a series of turns around the cable drive spool 124 in a tight fashion therefore providing frictional attachment to pull all the weight of the box solar oven assembly 180 on moveable carriage 58 in either linear direction without slippage. One end of the carriage drive cable 130 is attached or connected with clamps or a hook method to the vertical load shaft 72 (FIG. 9) closest to the cable drive spool 124 of the moveable carriage 58. The second end of the carriage drive cable 130 passes under the moveable carriage 58 and out the other side and down the structural extension assembly 34 to the end where cable loop pulley 126 is mounted onto the structural extension assembly 34 end with cable loop pulley mount plate bracket 128 by conventional methods and is looped around the cable loop pulley 126 to return to the second vertical load shaft 72 for again attachment to the moveable carriage 58. This system provides pulling tension of the cable for either direction of movement of moveable carriage 58 when the cable drive spool 124 is rotated in either direction.

An extendable lever handle 156 mechanism is used by the operator for polar angular rotation positioning of the extended positioning system 32. Referring to FIGS. 2, 4, and 5, this control mechanism includes an extendable lever handle 156 with a set screw attached access knob positioning collar 158 at the user end. The other end of extendable lever handle 156 is assembled with a pivot pin into a sliding drive block pivot yoke 160 providing for the extendable lever handle 156 to be pivoted (or rotated) 90 degrees from horizontal to vertical or vice versa when in use. The sliding drive block pivot yoke 160 fits and is assembled into a wrench drive plug 162 and after insertion a press fit retaining pin (not shown) is put into the sliding drive block pivot yoke 160 block body which captures the yoke 160 into the wrench drive plug 162. Then wrench drive plug 162 is then mounted and attached using two blind, screw tapped holes with set screws which are inserted through clearance holes in the diameter of the vertical pivoting member 42 of the pivot weldment 40 at the top and tightened into the wrench drive plug 162 thereby securing them together.

Referring to FIGS. 2, 4, 6 and 7, an azimuth positioning remote control mechanism includes an azimuth hand wheel and hand wheel drive shaft assembly 132, an azimuth worm gear drive mechanism 104, an azimuth bearing drive roller assembly 102, and an azimuth 12 inch bearing 250 (FIG. 12).

The azimuth hand wheel and hand wheel drive shaft assembly 132 includes the azimuth hand wheel 134 attached with a retaining screw to an azimuth hand wheel drive shaft 136 which extends down through a running slip fit clearance hole in the top of an azimuth miter gear drive shaft bracket 138 interconnecting with a first azimuth miter gear 140 which engages a second miter gear 140 therefore together changing the rotating power direction 90 degrees from vertical to horizontal. The second azimuth miter gear 140 is connected to a special azimuth D-profile drive shaft 142 that then runs the entire length of the structural extension assembly 34. The azimuth D-profile drive shaft 142 is mounted in running slip fit bearing clearance holes at each end at the bottom of the azimuth miter gear drive shaft bracket 138 and at the cable loop pulley mount plate bracket 128 to allow for power transfer rotation using the bearing holes. The miter gears 140 are fixed to the shafts with set screws or other mechanical common methods.

The azimuth worm gear drive mechanism 104 has a worm 106 that is mounted with its bore onto the D-profile drive shaft 142 with a running slip fit bearing clearance so it slides along the D-profile drive shaft 142 when the moveable carriage 58 is driven linearly with the cable drive spool 124. The bore of the worm is configured to either have a flat spot or keyed feature in the diameter, or a mechanical clip method (not shown) on its hub to provide a key type feature that prevents the worm from rotating around the D-profile shape of shaft 142 when rotational force is applied, yet still allowing free sliding longitudinally along the D-profile drive shaft 142. The design transfers the rotating power from the D-profile drive shaft 142 to the worm at any location along the extended positioning system 32. The rotating azimuth worm 106 engages an azimuth worm gear 108 which is connected to a drive roller shaft 114 and is passed through a running slip fit bearing clearance hole in an azimuth worm gear housing 110 (FIG. 8) that is machine screwed or attached by other common methods to the base plate 80 of the moveable carriage 58. A drive roller collar 118 secures and positions the azimuth worm gear 108 and drive roller shaft 114 together to the azimuth worm 106. A Drive roller 116 is attached in a secure standard method to the top of the drive roller shaft 114 to transfer the rotating power to the side edge of azimuth 12 inch bearing 250 (FIG. 12) and rotate the box solar oven assembly 180 for azimuth positioning and adjustments. At the interface between drive roller 116 and the side edge of azimuth 12 inch bearing 250, pressure is applied into the edge of the side edge of azimuth 12 inch bearing 250 with enough force to provide friction to drive the system. The force of the drive roller 116 may be achieved by various design methods including using a rubber roller preloaded at the side edge of azimuth 12 inch bearing 250 by setup adjustment of the azimuth worm gear housing 110 to the base plate 80 of the moveable carriage 58. Another design method (not shown) is to wedge shape the drive roller 116 in a downward fashion to jam (or wedge) the drive roller 116 into and against the side edge of the azimuth 12 inch bearing 250 using the downward force of gravity and/or another collar (not shown) to preset the downward wedge force in preloading setup. The rotational power can now be transferred from the operator's hand (azimuth hand wheel 134) to the azimuth 12 inch bearing 250 on the moveable carriage 58, at any location along the entire extended positioning system 32 distance.

Referring to FIGS. 2, 4, 5, 6, 7, 8, and 9, the solar altitude positioning control mechanism includes a solar altitude hand wheel and hand wheel drive shaft assembly 144 (shown in FIG. 2), a solar altitude worm gear drive mechanism 86, a cable winch drum and shaft assembly 94 and a cable winch cable 100 which is attached to a solar altitude cable attach bracket 216 (FIG. 12).

The solar altitude hand wheel and hand wheel drive shaft assembly 144 includes a solar altitude hand wheel 146 attached with a retaining screw to a solar altitude hand wheel drive shaft 148 which extends down through a running slip fit clearance hole in the top of a solar altitude miter gear drive shaft bracket 150 interconnecting with a first solar altitude miter gear 152 which engages a second miter gear 152 therefore together changing the rotating power direction 90 degrees from vertical to horizontal. The second solar altitude miter gear 152 is connected to a special solar altitude D-profile drive shaft 154 that runs the entire length of the structural extension assembly 34. The solar altitude D-profile drive shaft 154 is mounted in running slip fit bearing clearance holes at each end at the bottom of the solar altitude miter gear drive shaft bracket 150 and at the cable loop pulley mount plate bracket 128 to allow for power transfer rotation using the bearing holes. The miter gears 152 are fixed to the shafts with set screws or other mechanical common methods.

Figure 8:
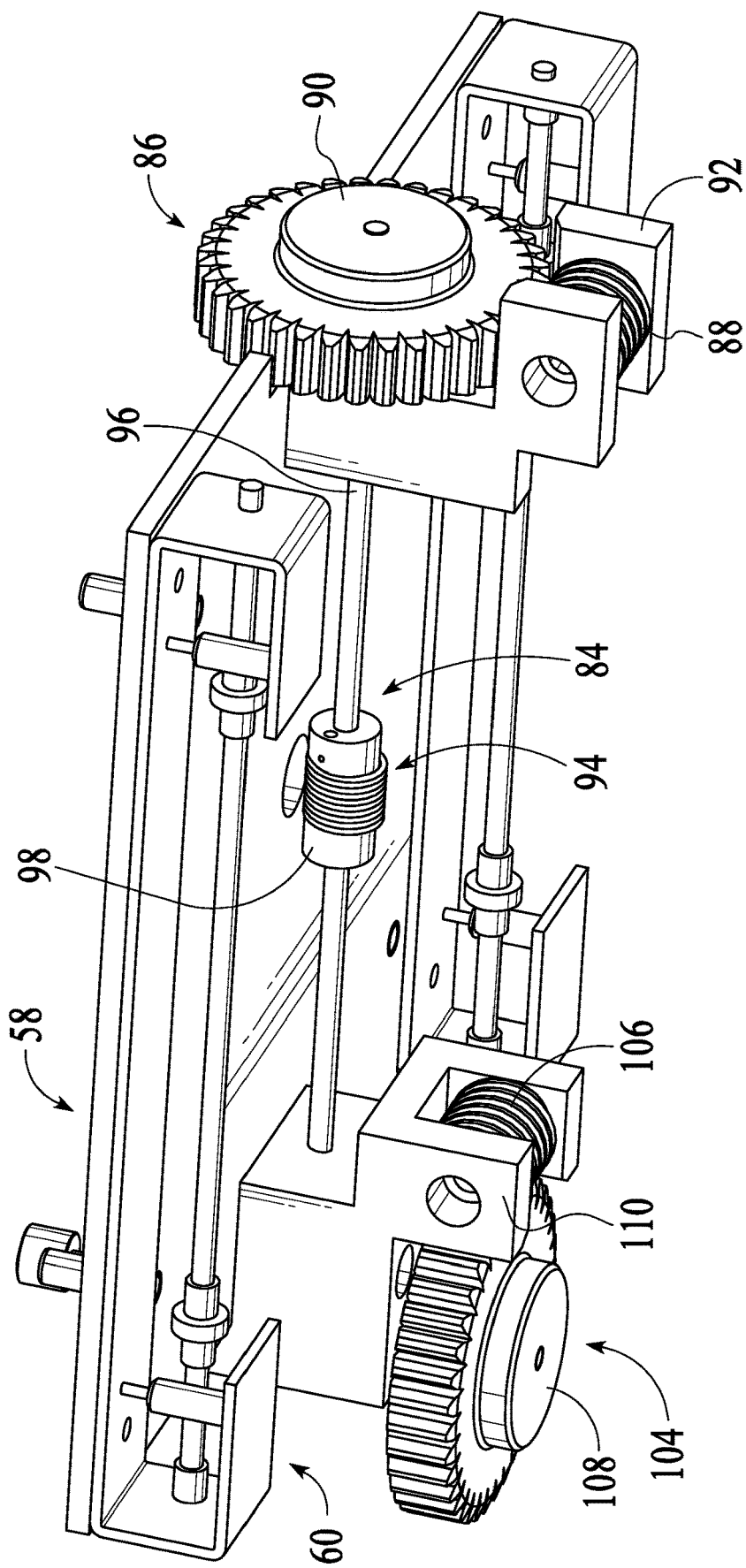
FIG. 8 is a bottom perspective view of a moveable carriage assembly features.

The solar altitude worm gear drive mechanism 86 has a worm 88 that is mounted with its bore onto the D-profile drive shaft 154 with a running slip fit bearing clearance so it slides along the D-profile drive shaft 154 when the moveable carriage 58 is driven linearly with the cable drive spool 124. The bore of the worm is configured to either have a flat spot or keyed feature in the diameter, or a mechanical clip method (not shown) on its hub to provide a key type feature that prevents the worm from rotating around the D-profile shape of shaft 154 when rotational force is applied, yet still allowing free sliding longitudinally along the D-profile drive shaft 154. The design transfers the rotating power from the D-profile drive shaft 154 to the worm at any location along the extended positioning system 32. The rotating solar altitude worm 88 engages a solar altitude worm gear 90 which is connected to a cable winch shaft 96 which is passed through a running slip fit bearing clearance hole in a solar altitude worm gear housing 92 that is machine screwed or attached by other common methods to the base plate 80 of the moveable carriage 58. The cable winch shaft 96 is also passed through a running slip fit bearing clearance hole in the azimuth worm gear housing 110 that is machine screwed or attached by other common methods to the base plate 80 of the moveable carriage 58 (FIG. 8). A cable winch shaft 96 retaining collar, where the cable winch shaft 96 passes through the solar altitude worm gear housing 92 (not shown) secures and positions the solar altitude worm gear 90 and cable winch shaft 96 together to the solar altitude worm 88.

Referring to FIGS. 9 and 12, a cable winch drum 98 is attached in a secure standard method to the cable winch shaft 96 to transfer the rotating power to a linear pull of the solar altitude cable winch cable 100, which then pulls to rotate the box solar oven assembly 180 for solar altitude positioning and adjustments. The solar altitude cable winch cable 100 is attached to the cable winch drum 98 with a set screw clamping design consisting of a tapped machine thread hole at the end of the drum intersecting a cable retention hole therefore being able to trap the cable securely to the drum.

The solar altitude cable winch cable 100 is wrapped around the cable winch drum 98 as many times as needed to provide enough linear cable length to rotate the box solar oven assembly 180 in any position within 90 degrees from horizontal to vertical for all possible operation applications. Solar altitude cable winch cable 100 then passes through the moveable carriage base plate 80, up through the azimuth bearing and pedestal base assembly 242, and attaches to the underside of the box solar oven assembly 180 at the solar altitude cable attach bracket 216 which is attached with screws to the cover protector 214 again with a set screw clamping design consisting of a tapped machine thread hole intersecting a cable retention hole for clamping the cable end securely into the solar altitude cable attach bracket 216. The rotational power can now be transferred from the operator's hand (solar altitude hand wheel 146) to the box solar oven assembly 180 at the solar altitude cable attach bracket 216 for rotation even when the moveable carriage 58 is at any location along the entire extended positioning system 32 distance. Furthermore, in this design, when the box solar oven assembly 180 is rotated with the azimuth control, the solar altitude cable winch cable 100 can flex and twist from the drum to the cable attach bracket 216 for the required flexibility needed to position the azimuth simultaneously with solar altitude ranging from less than 90 degrees to greater than 270 degrees of azimuth rotation positions.

Referring to FIG. 1, a protective storage shelter cover 268 is mounted to the side of the opening on the building above the height of the box solar oven assembly 180 with standard fastening methods. The box solar oven assembly 180 is manipulated with the extended positioning system 32 under the protective storage shelter cover 268 for storage until later use.

Figure 14:
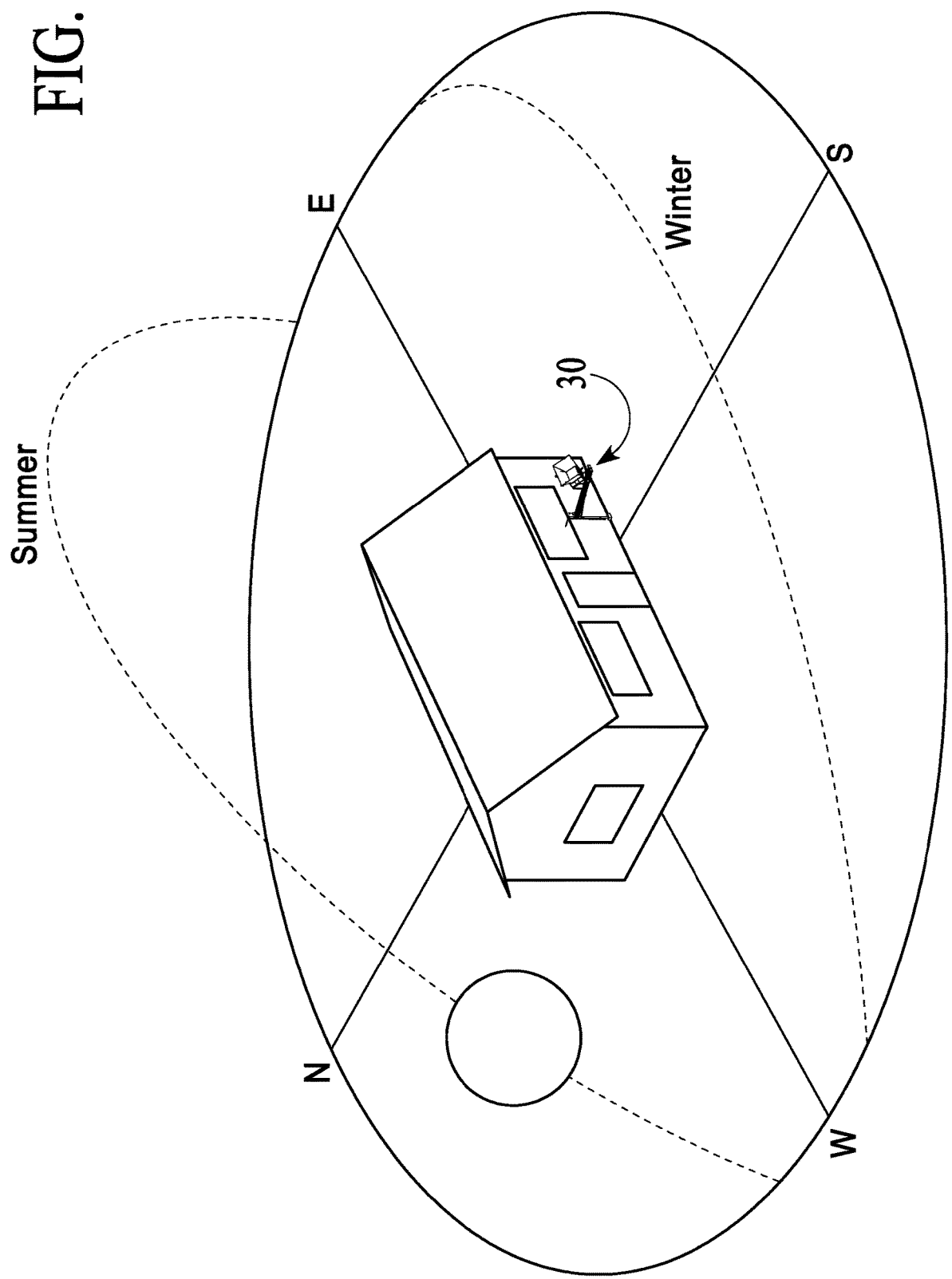
FIG. 14 is a pictorial sketch showing a sun path with respect to a solar oven mounted in position onto a building structure.
Figure 15:
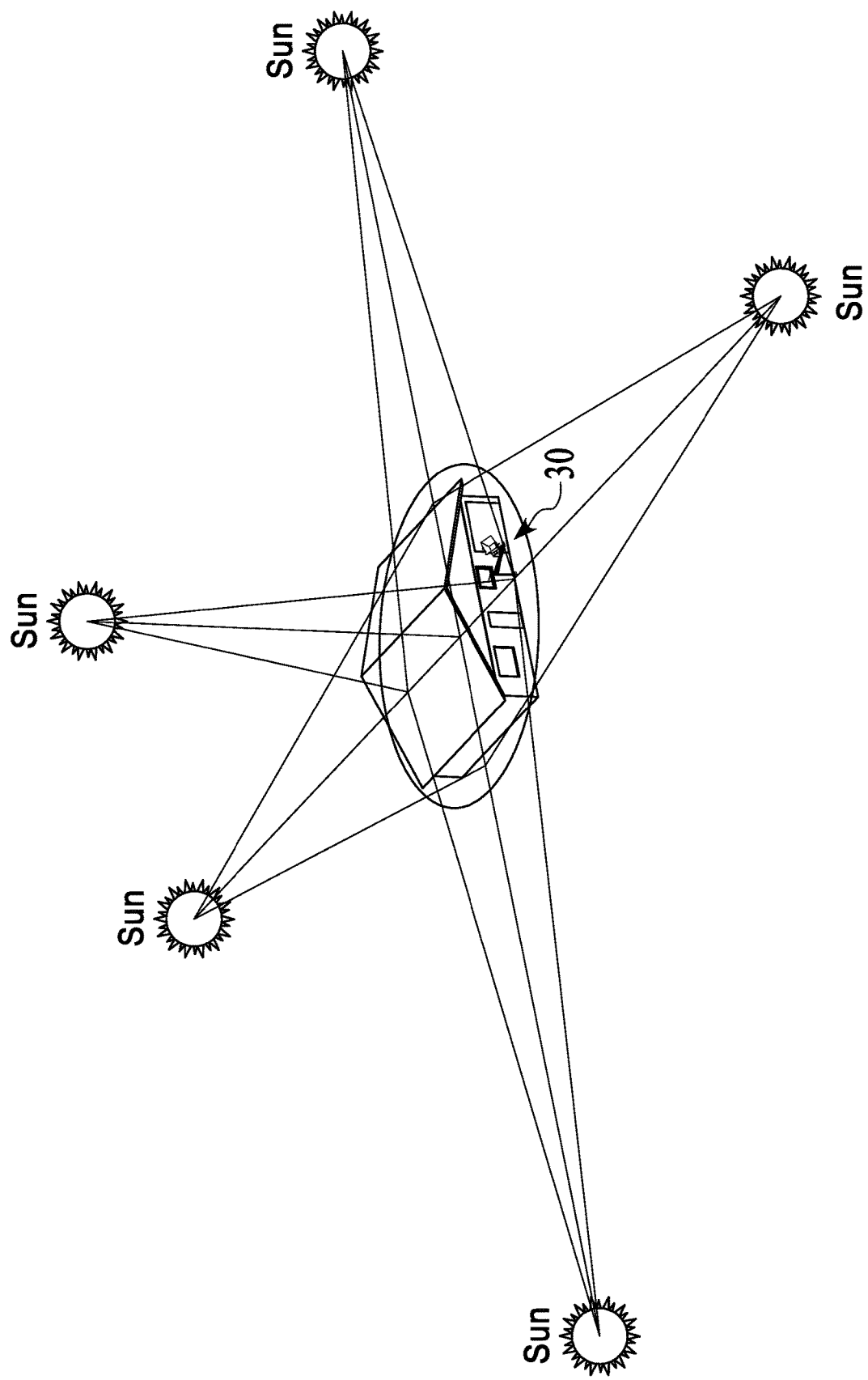
FIG. 15 is a pictorial sketch showing a potential reach for solar energy retrieval of solar energy around corners and past roof eaves.
Figure 16:
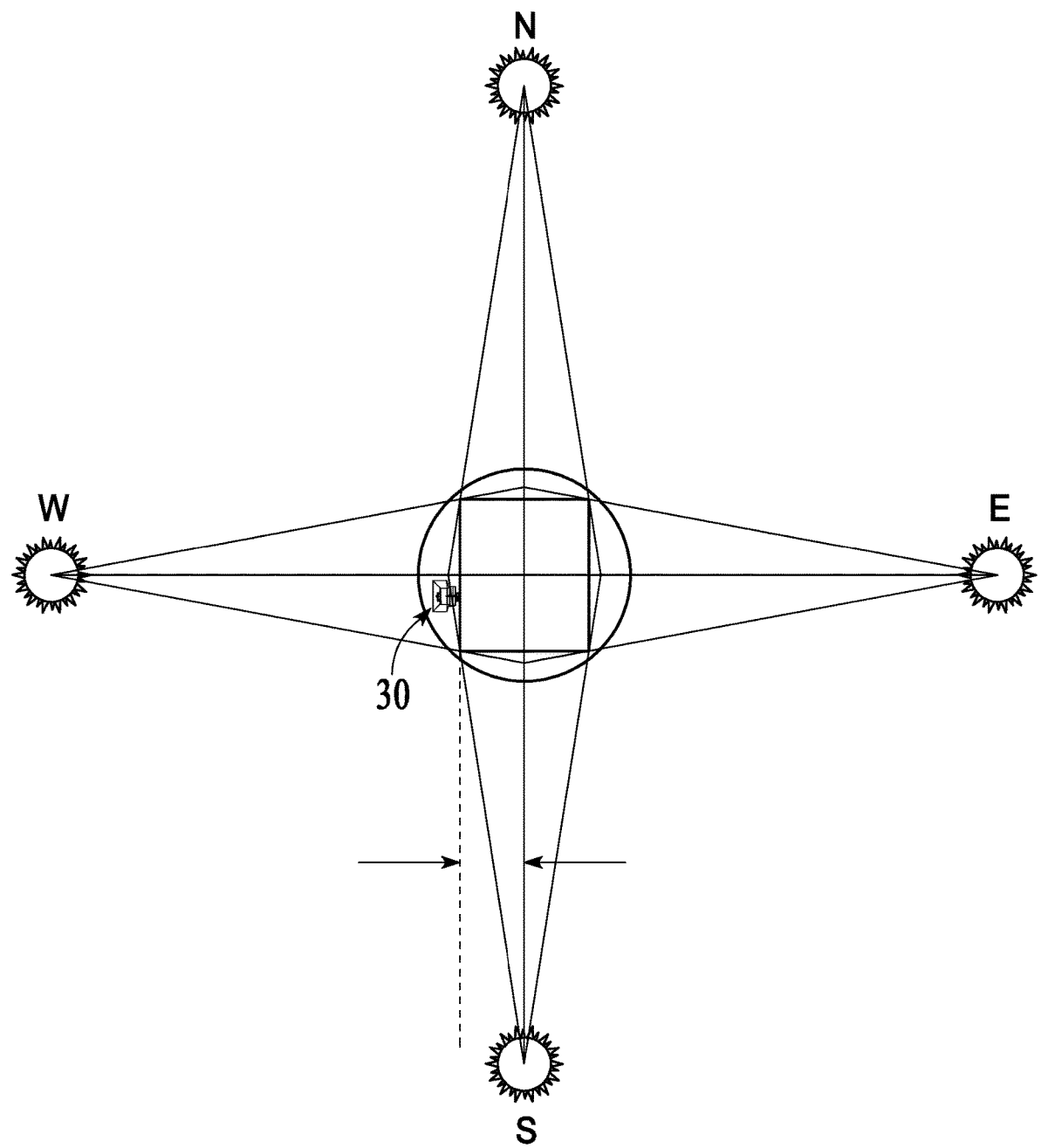
FIG. 16 is a top view sketch showing a potential reach for solar energy retrieval around corners and past roof eaves increasing exposure times with multiple direction installation.

Referring to FIGS. 14, 15, and 16, these diagrams illustrate and indicate the relative increased reach capabilities provided by solar oven system 30 to retrieve solar exposure around a general building structure. FIG. 14 shows the solar oven system 30 extending out in order to meet both summer and winter sun paths which eliminates shadowing from the building overhang and corners. FIGS. 15 and 16, show the potential angular projections of solar radiation exposure in perspective and top views. These views indicate how, in varied application directions, the system 30 can reach back (around a building corner) approximately 11 degrees at a 6 ft. extension of the extended positioning system 32 for increased solar exposure time and thus accommodate more varied building directions and geographic locations for universal utility. FIG. 16 shows how an east or west solar oven system 30 application can get increased solar exposure time due to reach back around a building corner.

The solar oven system operates as follows. The operator opens the building opening from the kitchen cooking area and reaches to operate the system with remote control mechanism and devices 120 at the opening bottom edge and retrieves the solar oven system 30 from protective storage for use (FIG. 2).

The extendable lever handle 156 end access knob being held in an accessible location with an access knob positioning collar 158, is pulled vertically straight up fully out of the pivot weldment 40 and then the extendable lever handle 156 is rotated 90 degrees in the sliding drive block pivot yoke 160 into the horizontal position for use as shown in FIG. 2. The extendable lever handle 156 is then pulled or pushed sideways left to right, to provide pivoting torque transmitted through the sliding drive block pivot yoke 160 into the wrench drive plug 162 to the pivot weldment 40 by the user which then rotates the extended positioning system 32, made up generally of the pivot weldment 40, structural extension assembly 34, moveable carriage 58, along with the box solar oven assembly 180. This moves the solar oven system 30 out of protective storage, away from, and perpendicular to the building wall, in front of the opening for cooking use as in the position shown in FIG. 2. The extendable lever handle 156 is then again rotated 90 degrees in the sliding drive block pivot yoke 160 into the vertical position and lowered back down into the pivot weldment 40 putting it into its original storage position when the access knob positioning collar 158 contacts the wrench drive plug 162 for later use and therefore not interfering with the other operational procedures and features.

Then the two remote control mechanisms and devices 120 for azimuth and solar altitude are used to align the back-door surface of the box solar oven assembly 180 to be parallel to the wall opening as in FIG. 2.

The azimuth hand wheel 134 (FIG. 4) and solar altitude hand wheel 146 are rotated individually, each driving it's two drive shafts, azimuth hand wheel drive shaft 136, azimuth D-profile drive shaft 142, solar altitude hand wheel drive shaft 148, and solar altitude D-profile drive shaft 154. The D-profile drive shafts 142 and 154 transmit the rotating power coming through the miter gears 140 and 152 to turn worm gear mechanisms 104 and 86 (FIG. 7), respectively. The azimuth worm 106 turns the azimuth worm gear 108 that turns the drive roller shaft 114 which then turns drive roller 116, thereby turning the azimuth 12 inch bearing 250 for azimuth positioning of the box solar oven assembly 180.

The solar altitude worm 88 (FIG. 8) turns the solar altitude worm gear 90 which turns the cable winch drum and shaft assembly 94, which then, when rotating, pulls the cable winch cable 100 in a linear direction causing the box solar oven assembly 180 to rotate into the desired solar altitude position.

The operator then rotates the linear hand wheel 122 (FIG. 3), therefore turning the cable drive spool 124 and pulling the carriage drive cable 130 which, in turn, moves the box solar oven assembly 180 which is on the moveable carriage 58 and pulls it towards and up to the wall opening ready for use.

The door assembly 218 is then pulled out of the box solar oven assembly 180 and temporarily positioned somewhere in the food preparation area until later use (if a hinged door design is used than this no longer applies). The prepared food containers are then loaded and positioned on the food rack horizontal plate 240 (FIG. 11) being stacked or positioned to the desired liking. The door assembly 218 is then reinserted back into the box solar oven assembly 180, therefore closing the box solar oven 180 for the cooking operation.

Again, rotating the linear hand wheel 122 (FIG. 3) deploys the loaded box solar oven assembly 180 out into the open environment by pulling the moveable carriage 58 out to the end of the extended positioning system 32. The wall mount system 164 (FIG. 2) provides the necessary strength to accommodate the deployed loaded box solar oven assembly 180 out away from the building structure by all vertical load forces directed down in the ground foundation block 178, horizontal loading held in equilibrium by the pivot post 174 and pivot post straps 176, pivot post saddle weldment 166, pivot weldment 40, and beam suspension support truss assembly 48. The azimuth hand wheel 134 (FIG. 4) and solar altitude hand wheel 146 are now rotated again by the operator to align the box solar oven assembly 180 in position (towards the sun) for optimum solar energy retrieval. As the azimuth hand wheel 134 and solar altitude hand wheel 146 are now being rotated, the operator visually uses the light alignment indicator assembly 256 (FIG. 13) and the light beam spot on either side of translucent target 264 to indicate and communicate the amount of azimuth and solar altitude adjustment alignment required for the box solar oven assembly 180 with respect to its related perpendicularity of the glazier surface to the sun's incoming rays.

Solar cooking is now in full operation without spillage, leaving the kitchen, or other deployment problems associated with the prior art. Now, periodically, the user visually checks and monitors the light alignment indicator assembly 256 translucent target 264 light beam alignment patterns and makes the desired necessary adjustments using the azimuth hand wheel 134 and solar altitude hand wheel 146 keeping the oven system collecting the greatest quantity of solar radiation. The indication of light rays which pass through the light indicator tube onto the translucent target 264 in a full round spot (not round or clipped off) indicates that the box solar oven assembly 180 is accurately aligned to the sun for optimum perpendicularity, therefore, energy retrieval.

As an alternative embodiment (FIG. 6), this manual solar adjustment and alignment process with azimuth hand wheel 134 and solar altitude hand wheel 146 can be configured to be semiautomatic or fully automatic by installing sun tracking devices to the azimuth and solar altitude control mechanisms such as clock motors on each hand wheel, weather spring driven or electric, or other apparatuses to rotate and track the sun path as needed with feedback or no feedback. This tracking would be operated after the above deployment with the manual controls to a sun path start position for the day or cook time.

When the cooking process is completed, the azimuth hand wheel 134 and solar altitude hand wheel 146 are then rotated by the operator to align the back-door surface of the box solar oven assembly 180 to be parallel to the wall opening as in FIG. 2. Then the operator again rotates, the linear hand wheel 122, therefore turning the cable drive spool 124 and pulling the carriage drive cable 130 which moves the box solar oven assembly 180 back towards and up to the wall opening ready for unloading. The door assembly 218 is then pulled out of the box solar oven assembly 180 and temporarily positioned somewhere in the food preparation area until later (if a hinged door design is used than this no longer applies). The prepared food containers are then unloaded back into the cooking area by removing them off the food rack horizontal plate 240. The door assembly 218 is then reinserted back into the box solar oven assembly 180, therefore closing the box solar oven 180 for storage.

Then the operator again rotates, the linear hand wheel 122, therefore turning the cable drive spool 124 moving the box solar oven assembly 180 back out away from the building wall and again pulls up extendable lever handle 156 end access knob which is pulled vertically straight up fully out of the pivot weldment 40 and then retracted back down 90 degrees in the sliding drive block pivot yoke 160 into the horizontal position for use pivoting the solar oven system 30 to the protective storage area for later use. The azimuth hand wheel 134 and solar altitude hand wheel 146 may be rotated by the operator to align the box solar oven assembly 180 under the protective storage shelter cover 268 (FIG. 1).

The center of gravity biaser spring 252, screwed to the plate 244 surface, keeps the solar altitude cable winch cable 100 constantly tight throughout the entire 90-degree rotation range when the altitude position is high enough to shift the center of gravity moment in reverse (a geometric characteristic of the oven shape). The center of gravity biaser spring 252 (FIG. 3) pushes on the bottom of the box solar oven assembly 180 upward therefore removing or eliminating the reverse force moment and maintaining the forward force moment (biased in one direction), therefore keeping cable winch cable 100 remaining tight and fully operational in any position without losing control due to cable 100 slack.

The solar altitude locking bar 254 (FIG. 12) is connected with a pivoting screw onto the box solar oven assembly 180 and slides in a slot at the yoke member 228 when the box solar oven assembly 180 is rotated. By tightening a locking finger screw (not shown) in the long solar altitude locking bar 254 slot, a clamping action of the solar altitude locking bar 254 to the yoke member 228 occurs, therefore locking the box solar oven assembly 180 into a set position. This is used for manually locking the rotating altitude position when needed during handling, maintenance, or assembly of the system.

The solar oven system embodiment provides a highly efficient, effective, and adaptive solar oven cooking apparatus that is easy for anyone to frequently use as a useful cooking device when doing standard ongoing cooking operations.

Reaching out away from the building structure into the outside environment for solar exposure when operated with remote controls without leaving the cooking area, and the adaptable flexible universality of the system features greatly enhancing practicality and usability, all provide increased significant development of solar oven technology in the prior art, therefore, substantially impacting energy savings, alternative energy use, and energy conservation.

The solar oven system embodiment provides a major advantage of integrating the needed solutions of the various and numerous problems encountered with solar cooking that, up until now were prohibitive to the operating requirements of each step in the entire solar cooking process. It is one complete seamless cohesive operation that has been solved with this new embodiment apparatus by integrating the functional process steps together from a kitchen area.

Featured examples of this new embodiment including the box solar oven structure rotating around the food contents during vertical solar altitude adjustments, all food handling being done in the kitchen area, and the ability to move out and position the box solar oven out away from the building and retrieve it back from inside the building are just three of the major advantages illustrating the practical innovative design of this embodiment.

In addition to the above-described embodiments, many other variations are possible. For example, solar oven system 30 and or extended positioning system 32 may be used for other food preparation needs such as cooling of hot dishes, making sun tea, drying fruit, drying dishes, or pasteurizing water.

The extended positioning system 32 may be used alone to adapt to and accommodate other portable box solar ovens built or purchased which are unrelated generic types to this solar oven system. If yoke member 228 (FIG. 12) is disconnected from the azimuth 12 inch bearing top mount plate 244, therefore enabling removal of the remainder of the box solar oven assembly 180, then any portable solar oven placed on top of the azimuth 12 inch bearing top mount plate 244, which is connected to the moveable carriage 58, would provide for the operator to be able to use three of the manual remote control mechanisms and devices 120, including the Linear hand wheel 122 for carriage movement, azimuth hand wheel 134 for adjusting azimuth, and the extendable lever handle 156 for polar angular rotation of the structural extension 34. This adaptation provides for expanded use of the described embodiment utilizing a wider range of market adaptations of generic prior art portable box solar ovens which further accelerates solar oven technology in the future.

The extended positioning system 32, with its universal utility including its manipulating and control features, may also provide other wider uses such as photo voltaic solar cell positioning and operation, or other applications requiring extension and reach out away from buildings or other structures.

This embodiment, with its utility, can be adapted and reconfigured at the wall mount by eliminating the ground foundation block 178 loading path for multistory, above ground building and apartment use applications providing access to sunlight to residences and the like for solar cooking operations that would not normally be available to these applications. This further expands the solar oven technology.

Furthermore, the solar oven system 30 may also be used and mounted at any alternative location of the building structure, deck structure, wall, or post for added utility in various adapted settings. This will expand the alternatives available for solar radiation exposure.

Further, the option of creating a new cut wall opening designated solely for this solar oven system 30 provides the added benefit of having the box solar oven assembly 180 protective storage shelter cover 268 over and around the opening for ease and effective storage when pulled back to the building when the unit is not in use (not blocking a window opening when leaving the unit ready for the next use). Also, a new designated opening can provide better operator reach into the box solar oven 180 depending upon the interior layout of the cooking area. The protective storage shelter cover 268 can also be installed directly over and around the window opening if desired for ease and speed of the operation regarding the unit storage steps being removed.

Box solar oven assembly 180 can also be used and operated in a standalone configuration in the described embodiment placed anywhere such as a prior art portable unit and can be aligned by rotating manually then locked into position using the solar altitude locking bar 254 (FIG. 12).

Another variation of an embodiment of the solar oven system 30 would be to have the extended positioning system 32 structural extension assembly 34 lengthened for further reach out into the environment for solar radiation availability providing (if out far enough) approaching 360 degrees of solar exposure. By adding a section to the structural extension assembly 34 or having a telescoping section that extends out from the main structural extension 34, this could be accomplished. Due to the extensive structural extension length, a designed support assembly with wheel casters extending down to the ground or other surface and attached at some intermediate location along the structural extension 34 or at an end of structural extension 34 would provide added support for a long structural extension 34 while continuing to provide for movement when making polar angular adjustments of structural extension 34 with the extendable lever handle 156.

Referring to FIG. 12, the azimuth bearing and pedestal base assembly 242 can be changed in various ways to provide alternative ways to accommodate different applications and reduce parts and cost. For example, one alternative is to remove (not have) the pedestal base 248 and azimuth 12 inch bearing bottom mount plate 246 whereby then attaching the azimuth 12 inch bearing 250 directly to the moveable carriage base plate 80. Another is to remove the two top and bottom azimuth 12 inch bearing mount plates 244 and 246 along with the pedestal base 248 and attach the yoke member 228 and moveable carriage base plate 80 directly to the azimuth 12 inch bearing 250 (not removable readily from the extended positioning system 32 and no base for standalone operation). These configurations reduce the amount of parts and cost of the azimuth bearing and pedestal base assembly 242 which are not necessarily required for some stand alone or other application functions. Or, the pedestal base 248 can be attached directly to the yoke member 228 (no azimuth 12 inch bearing 250 or azimuth function unless a separate bearing is inserted under the pedestal base 248) for a standalone system (operating without the extended positioning system 32).

Another variation of the solar oven system 30 is that door assembly 218 can include a hinge and latch design at the top or bottom of the door edge to increase and simplify operation efficiency which keeps the door attached at all times to the oven body and speeds up the loading process. Either design of press fit insertion (described in the above description) or hinged attachment can be used depending on cost and process method application requirements.

Different alternative wall mount system design configurations to accommodate various applications include a steel stake retention rod driven into the ground replacing the saddle bottom retaining bracket 172 which was previously employed. This stake retention method includes a horizontal flange (not shown which is welded onto the M-shape saddle 168) protruding from one side of the M-shape saddle 168 near the ground surface with a hole for the insertion and driving of a retention rod driving it deep into the ground material for secure retention of the bottom of the pivot post saddle weldment 166. This design is needed when the building wall design and material do not accommodate the saddle bottom retaining bracket 172 design shown in the preferred embodiment described above. Also, the saddle top retaining stud 170 can be converted to another shape design of a flange with a hole or other for accommodating different building designs. Screws, bolts, other type fasteners, or other standard prior art retaining methods can be used if necessary to attach the pivot post saddle weldment 166 to the wall as well.

The azimuth worm gear drive mechanism 104 (FIG. 7) can be changed to a miter gear 90 degree (no gear reduction) or bevel gear (reduction) alternative design if desired. This provides an alternative for a direct drive gear ratio of one to one in the drive system or other gear reduction ratio to the azimuth 12 inch bearing 250. This reduces the turning revolutions the operator must make to change azimuth position. These designs also allow for cost reduction in manufacture.

Sun tracking clock motors, servo motors (spring force, electric, or other), or other server mechanisms can be mounted and attached to the azimuth and solar altitude hand wheel and hand wheel drive shaft assemblies wheels 132 and 144 (FIG. 2) for driving and turning the remote-control devices to track the sun path for automatic adjusting to sun position throughout the day therefore, not requiring operator intervention for the entire cooking time.

The positioning system can include a sun tracking system that utilizes servo motors that adjust positioning of the solar oven radiation collection device. For example, a sun location system can be used to identify current location of the sun, and the servo motors (or other servo mechanisms) can adjust positioning of the solar oven radiation collection device based on information about location of the sun provided by the sun location system.

For example, a market manufactured automated sun tracking system using either a fixed control algorithm, fixed control mechanism, or dynamic tracking system design can be adapted and integrated into the solar oven system 30 (FIG. 2) by attaching automatic sun tracking system components onto the extended positioning system 32 and box solar oven assembly 180. Referring to FIG. 5 and FIG. 6 servomotors 270 and 274 are mounted to the azimuth hand wheel drive shaft 136 and solar altitude hand wheel drive shaft 148 with azimuth servomotor mount bracket 272 and solar altitude servomotor mount bracket 276 with machine screws or other standard attachment methods. The servomotor drive shafts are connected with azimuth servo drive coupling 280 and solar altitude servo drive coupling 282 with set screws to the azimuth and solar altitude hand wheel drive shafts 136 and 148 for driving the azimuth and solar altitude hand wheel & hand wheel drive shaft assemblies 132 and 144 (FIG. 2). The azimuth and solar altitude servomotor mount brackets 272 and 276 are then attached to azimuth miter gear drive shaft bracket 138 and solar altitude miter gear drive shaft bracket 150 (FIG. 6) with machine screws or another standard attachment method to connect and hold the servomotors stationary with respect to the positioning system 32 frame when rotating. A feedback light sensor unit 278 (FIG. 11) mounted on the translucent target 264 (FIG. 13) under the end of the light indicator tube 260 receives light from the light indicator tube when in alignment communicating to the servomechanism to stay in position, or if partial light, adjust to align. This feedback light sensor unit 278 would be used for a dynamic system design requiring a feedback sensor circuit. A solar tracking controller 284 is then connected to the sensor circuit and servomotors for solar tracking control.

Further, servo motors can be employed that position using a GPS (Global Positioning System) control signal from a cell phone or other electronic device. Furthermore, a solar oven system software application on a cell phone could be employed to adjust and monitor temperature and sun alignment by the operator during the cooking process and operations using current telecommunications technology.

Figure 17:
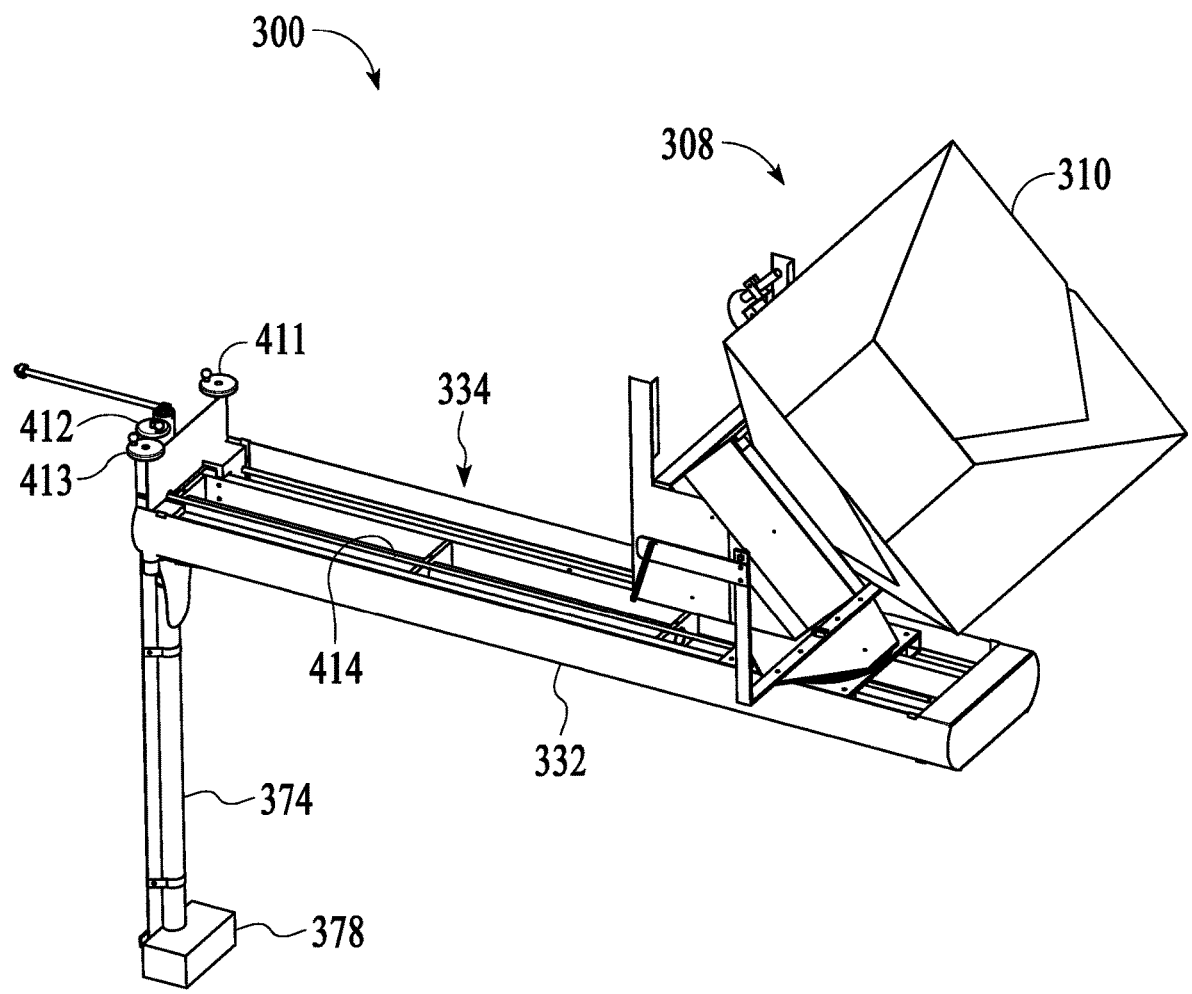
FIG. 17 and FIG. 18 show a solar oven system with an electronic control unit.

FIG. 17 shows an embodiment where a discrete electronic control unit has been added to a positioning system for solar oven system 300. As shown in FIG. 17, solar oven system 300 is similar to the solar over system shown in FIG. 1, having for example, a box solar oven assembly 308, a solar collector panels assembly 310, a structural extension assembly 334, an extended positioning system 332, a pivot post 374, a ground foundation block 378, and other similar features. Box solar oven assembly 308 functions as a solar oven radiation collection device.

Figure 18:
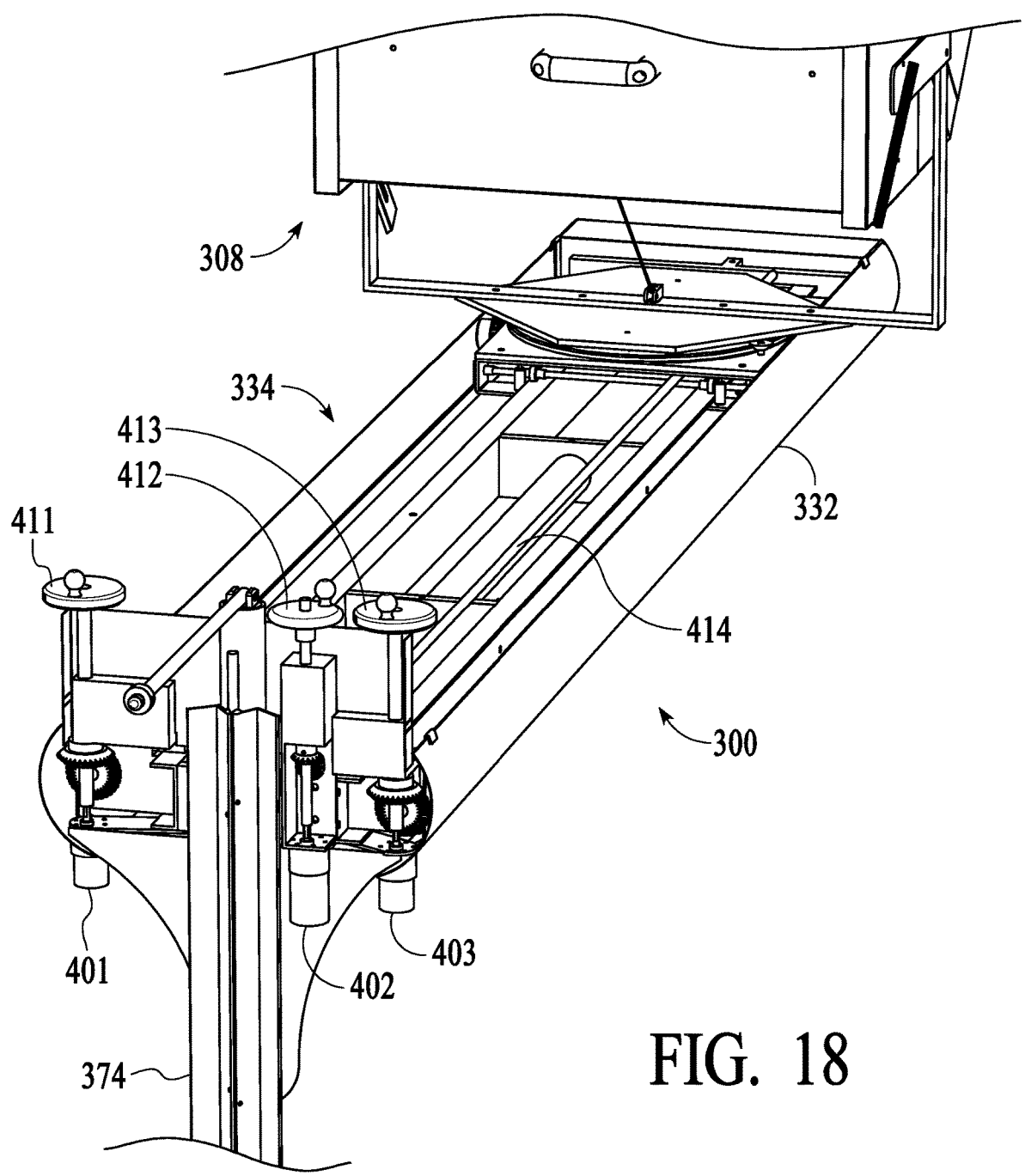

In solar oven system 300, electric motors can be used to automate adjustments to the position of box solar oven assembly 308. For example, FIG. 18 shows a solar altitude electric motor 401, a linear deploy electric motor 402 and a solar azimuth electric motor 403 used to adjust position of box solar oven assembly 308. Linear deploy electric motor 402 is used to control linear movement of box solar oven assembly 308 along an axis of structural extension assembly 334 with a linear deploy lead screw 414. Solar altitude electric motor 401 is used to adjust orientation of box solar oven assembly 308 to take into account changes in solar altitude with respect to time. Solar azimuth electric motor 403 is used to adjust orientation of box solar oven assembly 308 to take into account changes in solar azimuth with respect to time. A solar altitude override handle 411 can be used to disengage power transmission of solar altitude electric motor 401 and manually adjust for solar altitude, a linear deploy override handle 412 can be used to disengage power transmission of linear deploy electric motor 402 and manually adjust linear deploy and a solar azimuth override handle 413 can be used to disengage power transmission of solar azimuth electric motor 403 and manually adjust for solar azimuth. For example, motor 401, motor 402 and motor 403 are electric gear motors.

Figure 19:
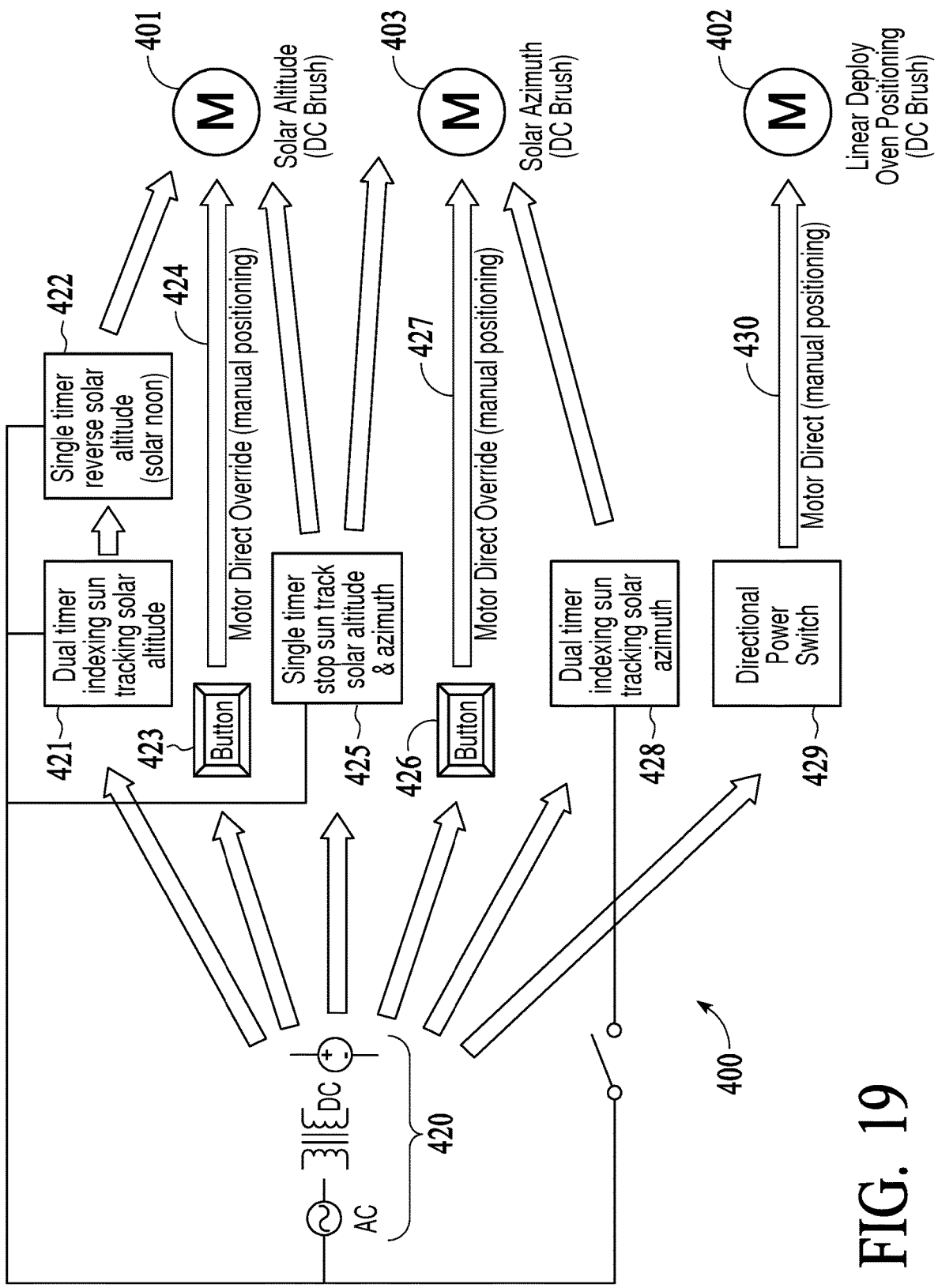
FIG. 19 is a simplified block diagram of a control system.
Figure 20A:
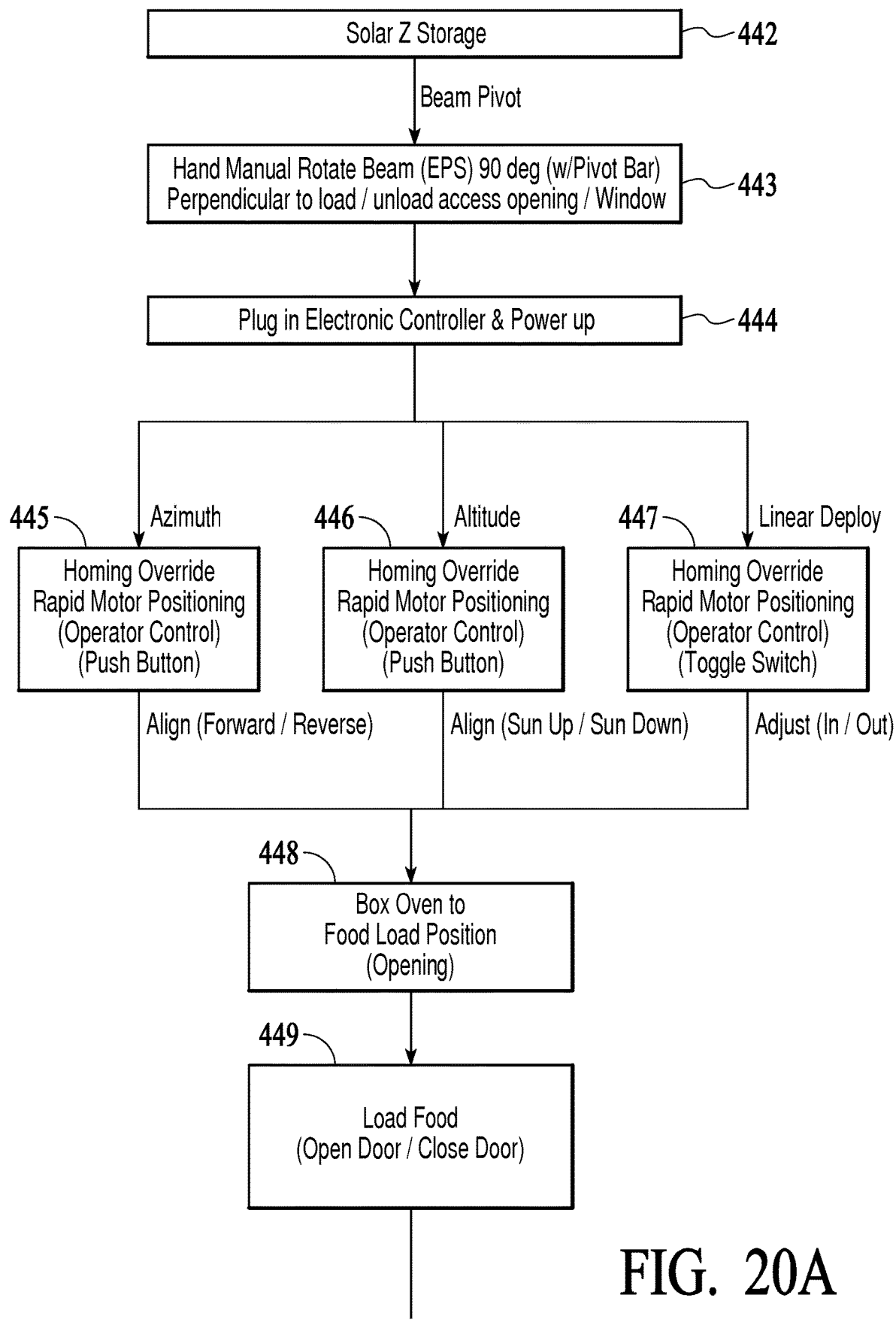
Figure 20B:
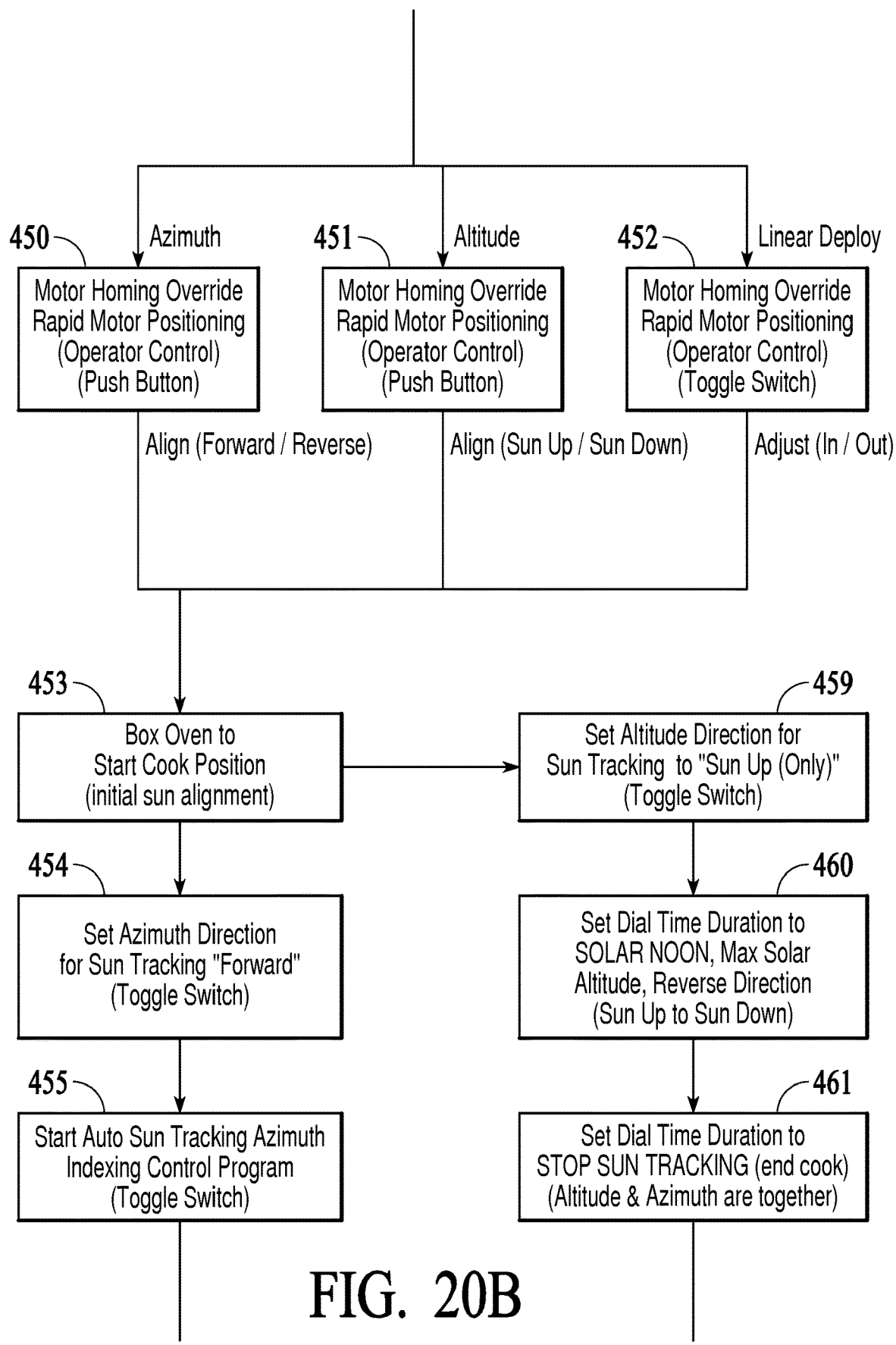
Figure 20E:
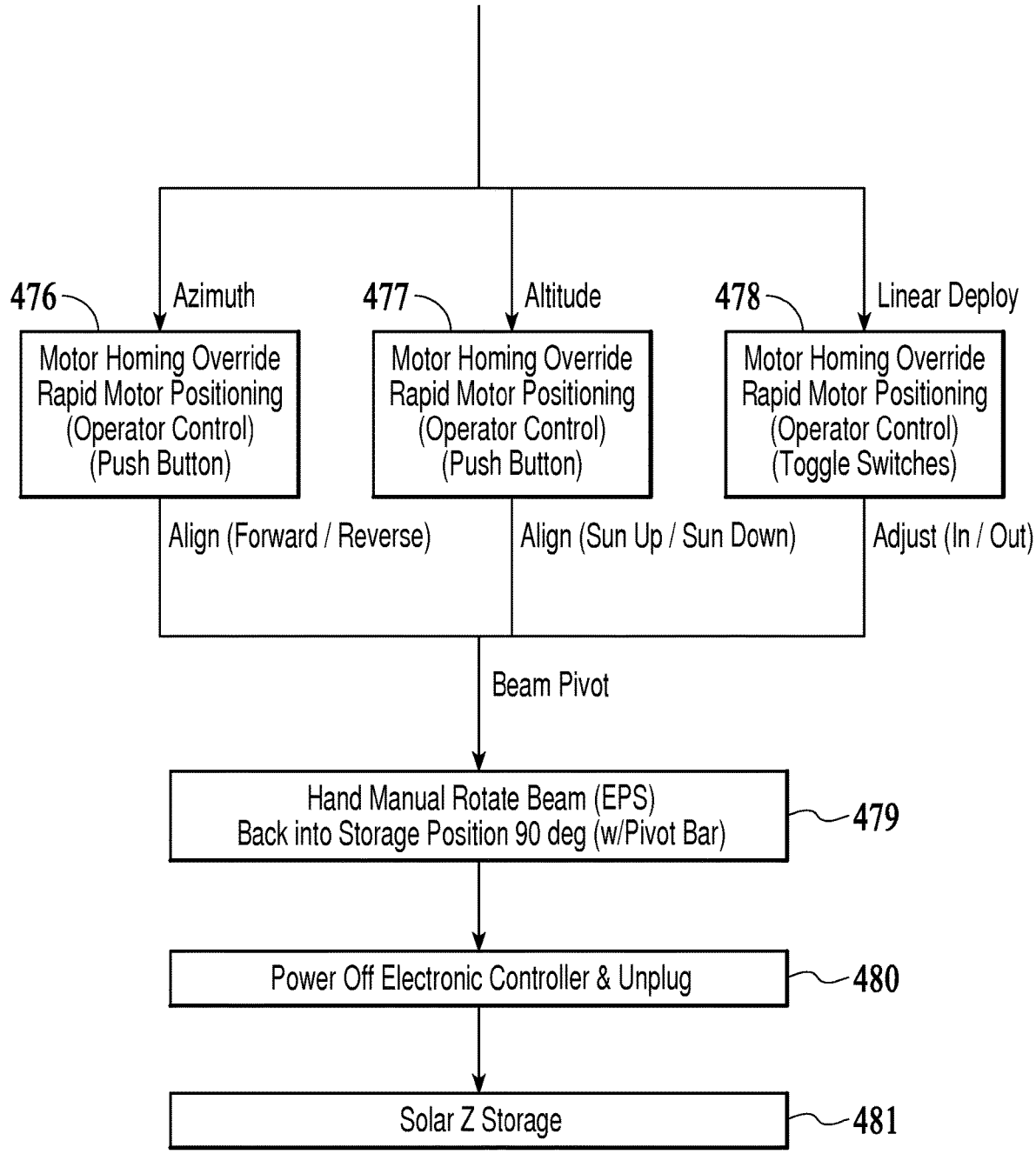

FIG. 19 is a simplified block diagram of a controller system 400 that controls solar altitude electric motor 401, linear deploy electric motor 402 and solar azimuth electric motor 403.

A power source includes a transformer 420 converting AC power to DC power used in controller system 400. A timer 421 functions as a dual timer to index sun tracking solar altitude to follow the sun by index positioning the box solar oven along the sun path to enable solar cooking. A timer 422 functions as a single timer tracking reverse solar altitude which reverses (changes) the direction of solar altitude at solar noon for continuous sun following for the whole day (sun up to sun down). A timer 425 functions as a single timer that stops sun tracking of solar altitude and azimuth tracking at the end of cook time to prevent interference caused by excessive automatic translation of the solar oven system 300. Timer 421 and timer 422 are used to control solar altitude electric motor 401 to allow positioning of box solar oven assembly 308 to take into account changes in sun altitude over cook time. An arrow 424 represents manual override positioning with solar altitude electric motor 401. An override button switch 423 is used for rapid motor positioning by an operator using solar altitude electric motor 401. Further, the option of Non-electric (no Motor) override is always available when needed by manually lifting up solar altitude override handle 411 to disconnect solar altitude electric motor 401 out of the drive train in order to be able to rotate by hand with the solar altitude override handle 411. When solar altitude override handle 411 is released, reconnection of the solar altitude electric motor 401 is reengaged for electric control. Connection and disconnection are accomplished by the solar altitude electric motor 401 shaft having a "D" profile shape and the solar altitude override handle 411 shaft end having a "D" profile hole providing the two shafts to slide together and lock for power transmission and slide apart for power disconnect.

A timer 428 functions as a dual timer to index sun tracking for solar azimuth to follow the sun by index positioning the box solar oven along the sun path to enable solar cooking. Timer 428 is used to control solar azimuth electric motor 403 to allow positioning of box solar oven assembly 308 to take into account changes in sun azimuth over cook time.

An arrow 427 represents manual override positioning with solar azimuth electric motor 403. An override button switch 426 is used by an operator for rapid motor positioning using solar azimuth electric motor 403. Further, the option of Non-electric (no Motor) override is always available when needed by manually lifting up solar azimuth override handle 413 to disconnect solar azimuth electric motor 403 out of the drive train in order to be able to rotate by hand with the solar azimuth override handle 413. When solar altitude override handle 413 is released, reconnection of the solar azimuth electric motor 403 is reengaged for electric control. Connection and disconnection are accomplished by the azimuth electric motor 403 shaft having a "D" profile shape and the solar azimuth override handle 413 shaft end having a "D" profile hole providing the two shafts to slide together and lock for power transmission and slide apart for power disconnect.

An arrow 430 represents direct manual rapid positioning with linear deploy electric motor 402 using the directional power switch 429. Further, the option of Non-electric (no Motor) override is always available when needed by manually lifting up the linear deploy handle 412 to disconnect linear deploy electric motor 402 out of the drive train in order to be able to rotate by hand with the linear deploy handle 412. When linear deploy handle 412 is released, reconnection of the linear deploy electric motor 402 is reengaged for electric control. Connection and disconnection are accomplished by the linear deploy electric motor 402 shaft having a "D" profile shape and the linear deploy handle 412 shaft end having a "D" profile hole providing the two shafts to slide together and lock for power transmission and slide apart for power disconnect While the rapid positioning override feature is shown implemented using button switch 423 and button switch 426, other types of switches can also be used, as will be understood by persons of ordinary skill in the art.

The sun tracking functions, after operator setup, are designed open loop (no feedback) automatically operating without operator intervention and without direct feedback from sun rays. Timer 421, timer 422, timer 425 and timer 428 are used for sun path tracking to follow the sun by index positioning the box solar oven along the sun path to enable solar cooking use. Each of these timers is implemented, for example, using off-the-shelf electronic time delay relay. For example, each electronic time delay relay is a solenoid coil relay with switch contacts operating based on a time setting set by the operator. There are different logic functions that can be obtained depending on the design of the timer relay used. Timer Relays can have a single time setting or two or more multiple time settings. For example, there are multifunction timers with various function modes including recycler, off and on delay, sequential start, interval on delay, and many more. Switches available are many as well, including, for example, Single Pole Double Throw (SPDT) switches or Double Pole Double Throw (DPDT) switches.

A directional power switch 429 functions to control lineal location of box solar oven assembly 308 along structural extension assembly 334. For example, automated motor homing can be used to control linear deploy electric motor 402. An arrow 430 represents manual direct positioning with linear deploy electric motor 402 by using the directional power switch 429.

FIG. 20A, FIG. 20B, FIG. 20C, FIG. 20D and FIG. 20E show a flowchart that shows and describes an example of an operator solar cooking process with the steps and functions in order to perform a solar cook when using solar oven system 300 with controller system 400. As pointed out above, alternative to using the flow described in FIG. 20A through FIG. 20E at any time full hand manual positioning is available and can be used at any time. This allows for continued operation of solar oven system 300 even when no electricity is available or if the owner desires to own or operate the solar oven system 300 without electronics.

The sun tracking portion of the system includes three different specific functions that work together. All three sun tracking functions, after operator setup, are designed open loop (no feedback from sun rays) and automatically operating without operator intervention. The sun path tracking function operates with "dual time, electronic time delay relays" (timers) to follow the sun by index positioning the box solar oven along the sun path to enable solar cooking. A second function reverses (changes) the direction of solar altitude at solar noon for continuous sun following for the whole day (sun up to sun down). The third function is an automatic Stop Sun Track, (end of the solar cook) to prevent interference caused by excessive automatic translation of the solar oven system 300. The operator is not required to be present or available to turn off controller system 400 tracking system at the end of a cook which removes a significant solar cooking constraint to solar cook with solar oven system 300.

In FIG. 20A through FIG. 20E, a logic block 442 signifies solar oven system 300 is in storage. A logic block 443, a logic block 444, a logic block 445, a logic block 446, a logic block 447 and a logic block 448 illustrate locating box solar oven assembly 308 in position for food loading. A logic block 449 represents loading food into box solar oven assembly 308. A logic block 450, a logic block 451, a logic block 452 and a logic block 453 represent alignment of box solar oven assembly 308 to begin the cook process. A logic block 453, a logic block 454, a logic block 455, a logic block 456, a logic block 457 and a logic block 458 describe alignment and operation of sun tracking azimuth during cook time. A logic block 459, a logic block 460, a logic block 461, a logic block 462, a logic block 463, a logic block 464 and a logic block 465 describe alignment and operation of sun tracking altitude during cook time A logic block 466, logic block 468 and a logic block 469 represent auto sun tracking stopping when the cook time ends. A logic block 470 a logic block 471, a logic block 472 and a logic block 473 represent locating box solar oven assembly 308 in position for food unloading. A logic block 475, a logic block 476, a logic block 477, a logic block 478 and a logic block 479 represent box solar oven assembly 308 returned to the storage position. A logic block 480 and a logic block 481 illustrate power disconnected when box solar oven assembly 308 is in the storage.

Figure 21:
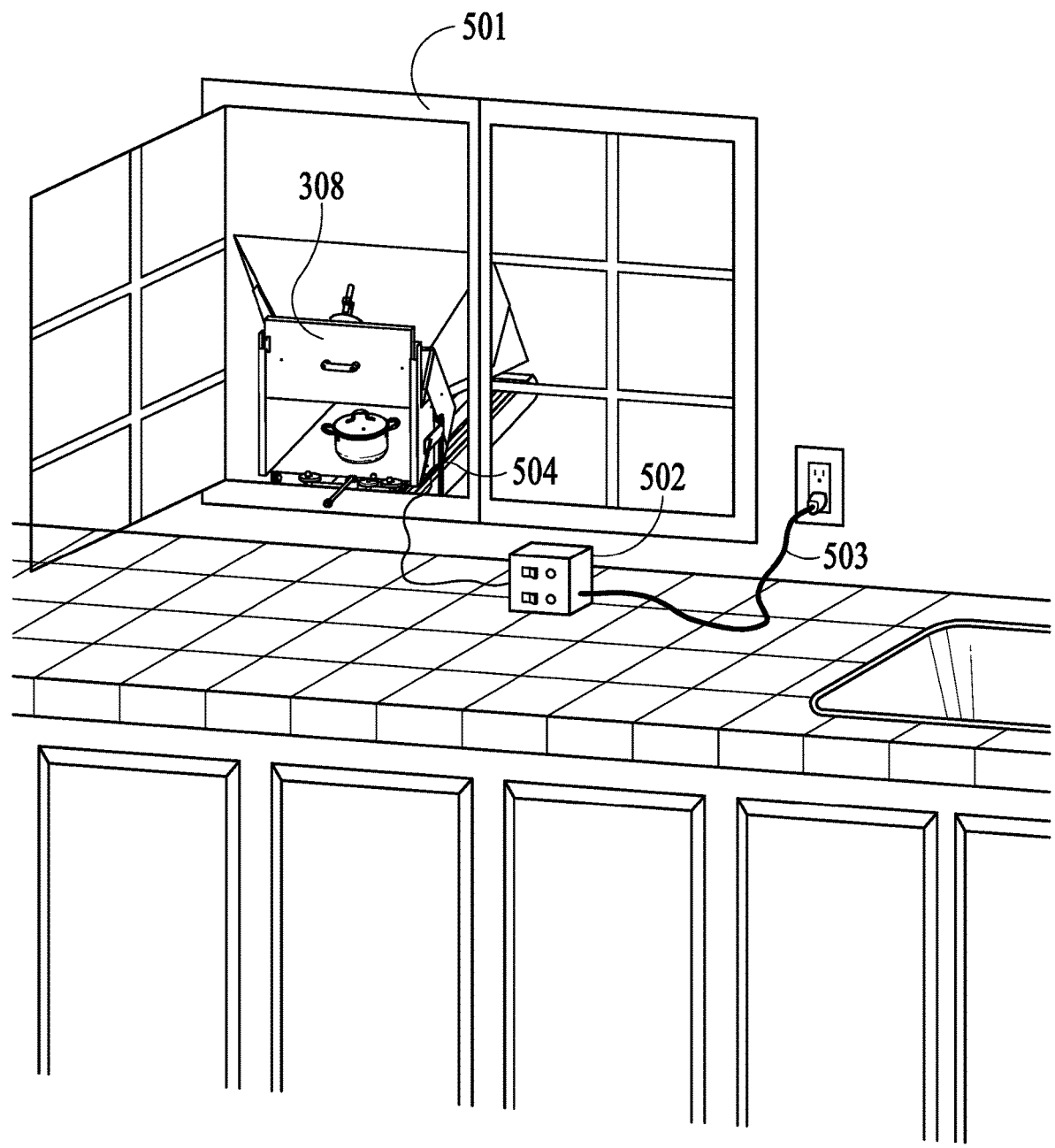
FIG. 21 shows a box solar oven assembly in position for loading and unloading food.

FIG. 21 shows box solar oven assembly 308 in position for food loading or for food unloading through a kitchen window 501. Casing 502 for control system 400. A power cord 503 can be plugged into a standard 120V AC power outlet. Control system 400 is connected to solar altitude electric motor 401, linear deploy electric motor 402 and solar azimuth electric motor 403 via a connector cable 504. All electronic components, except motors, are within casing 502 which also includes sensors switches and so on. Casing 502 is typically located in a kitchen protected from harsh outside weather.

The sun tracking performed by controller system 400 aligns with the sun path by indexing the box solar oven automatically in the solar azimuth and solar altitude axis positions incrementally to follow the sun path in order to receive solar radiation to solar cook. The timers, with relay contact switching, control the motor's running time and dwell (wait or delay) time to execute the index movement in each increment with time durations of inactivity in between. The sequence is constantly repeated stepping along the sun path. Each indexing axis movement (altitude & azimuth) is accomplished electrically with an individual dual time timer relay component that includes a DPDT (Double Pole Double Throw) relay contact switch which is wired "normally open" (NO) and will be able to close the circuit for an increment of time to run (turn on) the motor for the specified set amount of time (T2) to move the box solar oven. Then, the relay contact switch turns off (times out) which opens the circuit again for another specified (set) time duration, a "Dwell or Wait" time (T1), until the next index move of T2 motor run time. A DPDT toggle switch, in the same circuit, is cross wired in configuration to reverse polarity of the circuit alternately for setting the desired direction of the box solar oven movement. This provides a clockwise (CW) or counter clockwise (CCW) motor rotation defining the box solar oven direction of movement. In this way periodically positioning of the solar oven radiation collection is adjusted to take into account changes in sun altitude and sun azimuth over cook time.

The second function is reverse (change) direction of solar altitude at solar noon. It operates as an open loop with a "single time, electronic time delay relay" timed to achieve a switching sequence from sun up to sun down. This accommodates the change in solar altitude sun direction (sun up to sun down) if this change occurs during a specific solar cook depending on when cooking time takes place during the selected day. This is accomplished electrically with an Off Start, (On Delay) timer function Mode single time Timer Relay component with a DPDT (Double Pole Double Throw) contact relay switch in "series" in the circuit, which is cross wired relay in configuration to reverse polarity of the circuit alternately for changing (reversing) the direction of the box solar oven movement. This changes the solar altitude electric motor 401 rotation by providing clockwise or counter clockwise motor operation as desired. When the timer "times out", the DPDT (Double Pole Double Throw) contact relay switches the polarity of the circuit to make the solar altitude direction change to the down direction.

The third function is the automatic stop sun track at end of cook time. This turns off (stopping) the solar altitude and solar azimuth axis indexing movements to protect solar oven system 300 from interference conditions, therefore not requiring the operator to be present at the end of the cook. It uses a timed (time out) switching relay to turn off both indexing relay circuits to stop oven tracking movement.

This is accomplished electrically with an Off Start, (On Delay) timer function Mode single time Timer Relay component with a DPDT (Double Pole Double Throw) contact switch wired NC (Normally Closed) which, when times out, opens the two circuits to stop both axis from further indexing the box solar oven.

All three functions require no human operator intervention after the initial set up is performed to solar cook, which therefore, without needing the operator to make adjustments, frees an operator to have full convenience and freedom while the solar cooking takes place. This provides significant operational advantage to the solar cooking process.

Figure 22A:
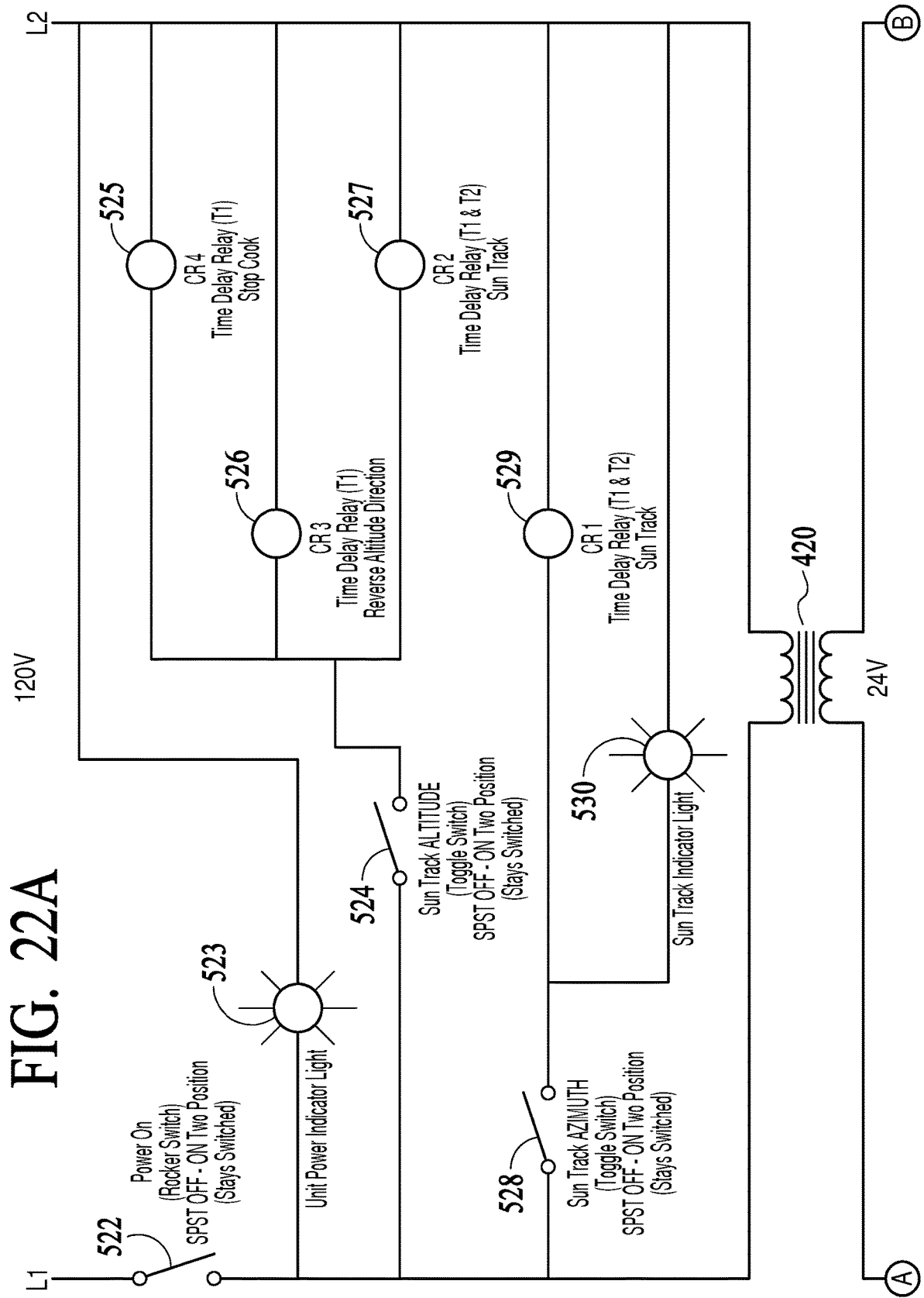
FIG. 22A and FIG. 22B show a simplified circuit drawing for a control system.
Figure 22B:
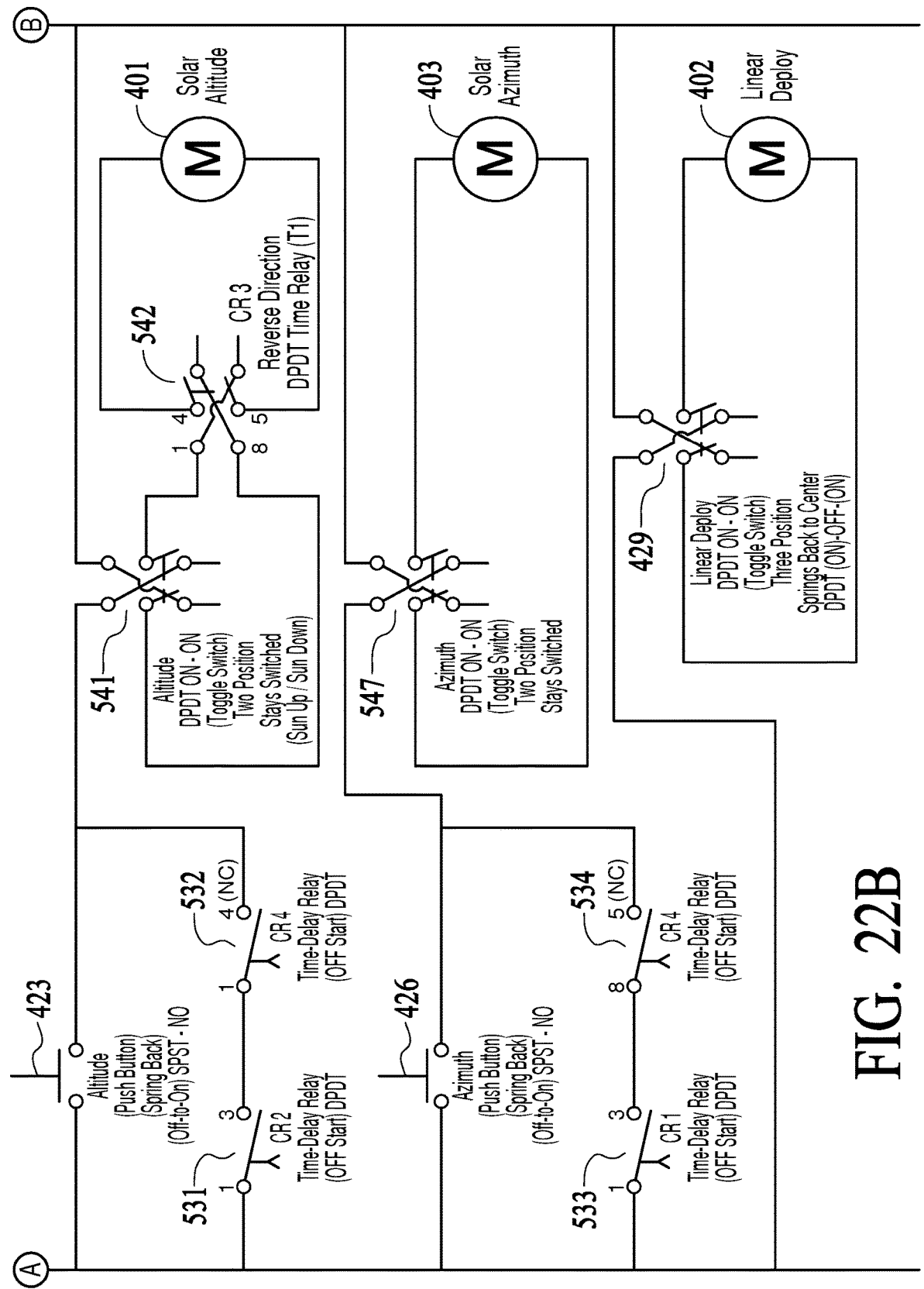

FIG. 22A and FIG. 22B show circuitry used to accomplish the three functions described above. As discussed above, the first two electric drive functions are solar altitude and solar azimuth axis positioning control features implemented by solar altitude electric motor 401 and solar azimuth electric motor 403. Solar altitude electric motor 401 and solar azimuth electric motor 403 operate in parallel. Override button switch 423 is used by an operator to override operation of solar altitude electric motor 401 and override button switch 426 is used by an operator to override operation of solar azimuth electric motor 403, at any desired time, even when the sun tracking is in full operation.

DPDT toggle switches are used in implementing timer 421, timer 422 and timer 428, as shown in FIG. 22B, with each switch functioning for both the electric manual bypass and time delay relay timer directions by changing circuit polarity for change in direction as needed. These DPDT toggle switches, in the circuit, are cross wired in configuration to reverse polarity of the circuit alternately for setting the desired direction of the box solar oven movement. This provides a clockwise or counter clockwise motor rotation defining the box solar oven direction of movement. DPDT toggle switch 541 is used to implement both timers 421 and 422. Cross wired switch 542 is used in series to further implement the directional change (sun up to sun down) of solar altitude electric motor 401. DPDT toggle switch 547 is used to implement timer 428.

Power for DPDT toggle switch 541 is provided through override button switch 423 or through time delay relay switch 531 and time delay relay switch 532 connected in series. Power for DPDT toggle switch 547 is provided through override button switch 426 or through time delay relay switch 533 and time delay relay switch 534 connected in series. When sun tracking for sun altitude is turned on using switch 524, then time delay relay 525 controls time delay relay switch 532, time delay relay 526 controls cross wired relay switch 542 and time delay relay 527 controls time delay relay switch 531. When sun tracking for sun azimuth is turned on using switch 528, then time delay relay 529 controls time delay relay switch 533. Time delay relay 525 controls time delay relay switch 534. Time delay relay 525 is used to stop sun tracking of solar altitude and azimuth tracking at the end of cook time.

A unit power light 523 indicates when power switch 522 connects the circuit to a 120 volt power source. A sun track indicator light 530 indicates when sun track is on using switch 528. For sun tracking, both switch 524 and switch 528 are in the "on" position.

In FIG. 22B, linear deploy directional power switch 429 is shown implemented as a DPDT On-Off-On spring back to center toggle switch cross wired in configuration to change polarity of the circuit changing direction as desired. This DPDT On-Off-On toggle switch, reverses polarity of the circuit alternately with position toggling to obtain the desired direction of the box solar oven movement while simultaneously powering the linear deploy electric motor 402. This allows movement of box solar oven assembly 308 along the length of structural extension assembly 334 out away from the building opening and out into the outside environment.

For example, within controller system 400, time delay relay 526, time delay relay 527 and time delay relay 529 are configured so that solar collector panels assembly 310 maintain optimum oven cooking temperature without always being directly aligned to the sun accurately. Being out of accurate alignment perpendicularly with the sun is not very crucial to temperature drop, up to an angular limit, (depending upon weather conditions, solar seasonal and regional radiation availability, collector panel design, heat retention capability, etc.). This forgiving to sun perpendicularity alignment provides opportunity and advantage for simpler, low cost, more averaging practical automatic control systems to be created and developed for tracking the sun path while still providing optimal box solar oven performance to adequately solar cook.

For example, in a typical manual solar cook process, the total collected solar energy to maintain optimal oven temperature can be achieved and includes the following general solar cooking operation steps and technique to aggregate the necessary solar energy to solar cook:

An initial alignment is performed to align sun rays perpendicular where the start cook is positioned to align solar collector panels assembly 310 to directly collect sun rays, which results in optimum solar collection direct align performance.

Over time there occurs slow misalignment out of perpendicular alignment that takes place as the sun moves across the sky and the box solar oven stays stationary. This misalignment continues and can continue for up to one or even one and a half hours while still maintaining solar cooking temperature depending on sun path conditions, location, collectors, box efficiency design, etc.

A second alignment is then hand manually performed to align sun rays perpendicular where the cooker is positioned to align solar collector panels assembly 310 to directly collect sun rays, which results in optimum solar collection direct align performance.

Over time there occurs slow misalignment out of perpendicular alignment that takes place as the sun moves across the sky and the box solar oven stays stationary.

A third alignment is then hand manually performed again to align sun rays perpendicular where the cooker is positioned to align solar collector panels assembly 310 to directly collect sun rays, which results in optimum solar collection direct align performance.

Over time there occurs slow misalignment out of perpendicular alignment that takes place as the sun moves across the sky and the box solar oven stays stationary.

A fourth alignment is then further performed hand manually to align sun rays perpendicular where the cooker is positioned to align solar collector panels assembly 310 to directly collect sun rays, which results in optimum solar collection direct align performance.

Over time there occurs slow misalignment out of perpendicular alignment that takes place as the sun moves across the sky and the box solar oven stays stationary.

The example above with four alignments cover a four to six hour cook time. This requires use of time delay relay 526, time delay relay 527 and time delay relay 529 to make alignment changes only four times over the course of this cooking time, while still maintaining sufficient cooking temperature to allow effective cooking.

Through research, observations and experience, in the prior art, it has been shown that approximately 10 to 20 degrees out of perpendicular alignment does not seem to result in a significant temperature drop within a moderately efficient box solar oven if the box solar oven is being realigned to perpendicularity incrementally throughout the cooking process. The estimated angles of 10 to 20 degrees stated above are based on crude observations and estimations to define these indicated angles. Further testing can be done within a particular usage environment to determine a minimum number of degrees out of alignment that will result in a temperature drop sufficient to negatively impact cooking. The minimum number of degrees or variance that is tolerable will vary with, geography, time of year, weather conditions, and sensitivity to temperature variance on the food being cooked. The greater the number of degrees out of alignment that can be tolerated, the longer the time that can elapse between alignments. The shorter the number of degrees out of alignment that can be tolerated, the shorter the time that can elapse between alignments.

Alternatively to alignment where at each position increment of the box solar oven assembly 308 being aligned so that at the optimum align time the solar collector panels assembly 310 is at an optimum perpendicular position to collect sun rays, the alignment can even be done with an offset to optimize the time between alignments and more closely follow the sun path. For example, in this case, the alignment could even be initially misaligned from perpendicular. Over time as the sun moves across the sky, alignment will improve until halfway through the sun path alignment cycle, perpendicular alignment will occur. Then as the sun continues moving across the sky, slow misalignment out of perpendicular alignment (misalignment) will take place as the sun moves across the sky and the box solar oven stays stationary. Therefore, by increasing optimum alignment increment frequency (indexing) of the box solar oven, the box solar oven keeps a closer following to the sun path overall by reducing the amount of misaligned stationary time of the box solar oven. This provides for closer overall alignment (pacing) flexibility with the changing sun path positions.

Figure 23:
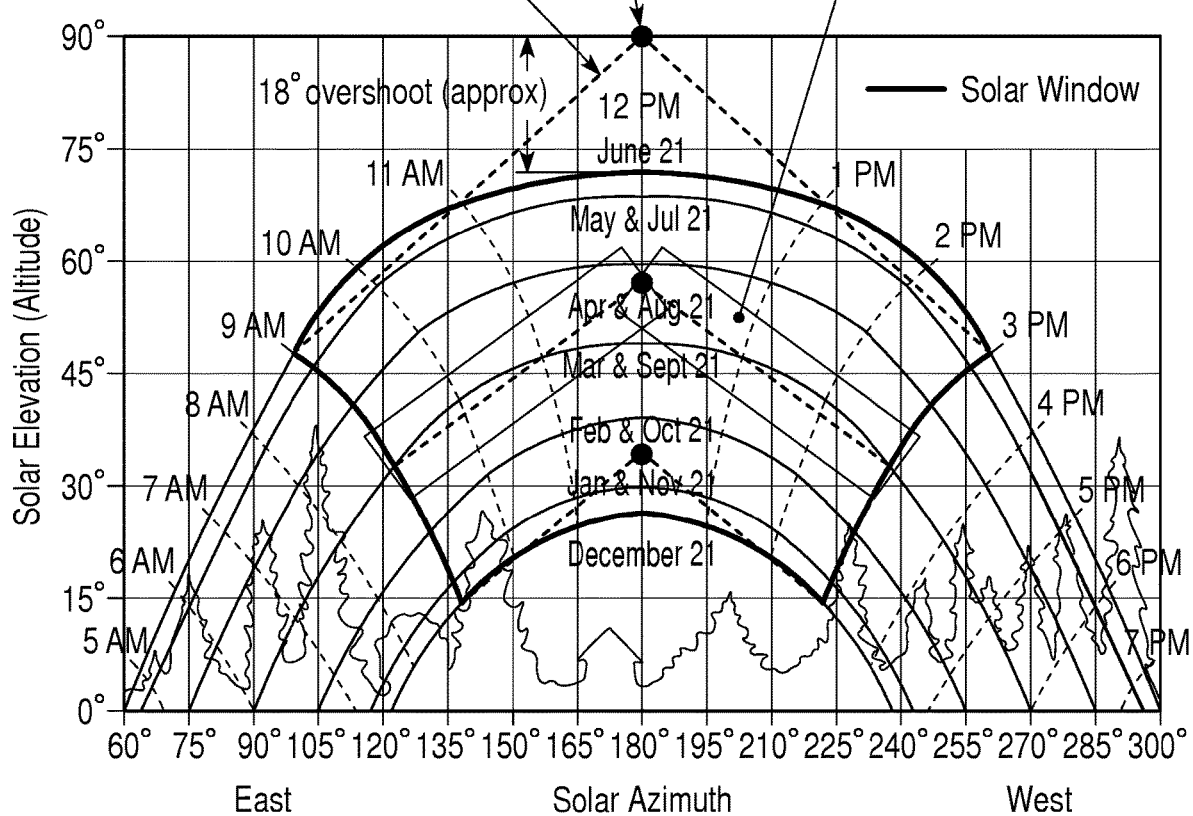
FIG. 23 is an example of a sun path chart.

FIG. 23 is an example of a sun path chart that is used to configure operation of time delay relay 526, time delay relay 527 and time delay relay 529. The sun path shows how the solar elevation (altitude) varies with solar azimuth depending upon the calendar date. FIG. 23 shows that as controller system 400 tracking approaches solar noon time there is an overshoot that is not functionally as significant as the figure may be visually indicating. The maximum seasonal overshoot is less than 20 degrees and the amount of time in this location does not reduce temperature in the box solar oven as discussed earlier. Also, notice that the slopes of the sun path season to season are nearly the same. This minimizes needing to make large season to season indexing speed adjustments, if at all, for obtaining an optimum cook. The solar noon time setting made in each specific daily individual cook by the operator makes up for and accommodates for the diurnal and seasonal changes in sun path.

For example, controller system 400 uses an algorithm of setting a dial, time duration from initial start of automatic tracking to solar noon, providing a specific control reference point no matter what time and initial start point is selected during the day. Controller system 400 resets the tracking system at each time of use reducing accumulated error from day to day changes all year. This provides the ability to always be able to follow the path of the sun cooking at any time of the day, season, or location.

The solar noon chart shown in FIG. 24 is an example of a chart that can be used by an operator to allow the operator to identify a specific solar noon time to be used for setting a solar noon dial time duration during a cook. This solar noon time information can be obtained for any global location wherever needed. The solar noon time information provided to controller system 400 assures accuracy making up for other natural parameter changes that can add up into sun tracking error and complications.

Approximation sun tracking as described above provides a practical opportunity to efficiently automate the ability of box solar oven assembly 308 to maintain adequate cooking temperature. This provides the advantage of eliminating the need for feedback (by using an open loop system) from the sun's rays where the sun's rays can be interrupted due to clouds, weather conditions and blowing material such as dust, rain and snow or failure of feedback components.

When a user prefers, approximation sun tracking can be turned off using switch 524 and switch 528. The user can manually adjust alignment using override button switch 423 and override button switch 426. Additionally, at any time, the user can non-electric manually adjust alignment using solar altitude override handle 411 and solar azimuth override handle 413 as described earlier.

While above is described approximation sun tracking using open loop without feedback from the strength of the sun's rays, operation of relay switch 531, relay switch 533 and cross wired relay switch 542 could also be configured based on feedback from the strength of the sun's rays. To implement closed loop sun tracking based on feedback from the strength of the sun's rays, a sensor is used to detect reduction of the detected strength of the sun's rays. Detected reduction passing a particular threshold can result in operation of relay switch 531, relay switch 533 and relay switch 542, to reposition box solar oven assembly 308 to maximize the detected strength of the sun's rays.

The positioning system can further be used to put any device on the moveable carriage 58 and have complete articulation of rapid positioning and automatic sun tracking with auto stop when using the controller system 400 electronic controller as fully described above without requiring any electrical wire or component hook up connections to the chosen device type at all. Approximation Tracking and the open loop design allows for extensive versatility of use in the current art.

Another significant advantage of this open loop controller system 400 which uses timer 421 and timer 428 with solar altitude electric motor 401 and solar azimuth electric motor 403 as described above is that any box solar oven 308 automated movement translations in sun tracking can be accomplished without needing to change the mechanical power transmission ratios (mechanical advantage gear ratios) to achieve different distances of movement. By setting a "Dwell or Wait" time (T1), and the T2 motor run time to different time durations open loop provides a wide range of extensively flexibility to adjust and adapt to various movement distances without requiring changes to the mechanical powered mechanisms to move the box solar oven. This simplifies and lowers cost to adapt to the many different sun path locations, electric motor design ratio and RPM speed selections for manufacturability, and other needed requirements. In the current art, it is perceived that closed loop feedback is the method to control variations in required movement distances and open loop feasibility due to distance variations not easily adjusted to. This novel approach with controller system 400 motor run timing resolves this issue and makes open loop possible to use with the required flexibility.

Further, due to approximation tracking and the open loop design of this positioning system with the controller system 400, no electrical wires need to be connected to the solar radiation collection device at all. This greatly simplifies the automation articulation and movement processes and avoids positioning interferences. This design therefore provides maximum, unimpeded operation flexibility to adapt to the many current art conditions and circumstances.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention.

What is claimed is:

1. A solar oven system, comprising:
    a solar oven radiation collection device;
    a structural extension assembly that extends in a radial direction with respect to a structure;
    a moveable transport that provides linear movement of the solar oven radiation collection device along an axis of the structural extension assembly;
    a linear deploy electric motor that is used to control linear movement of the solar oven radiation collection device along the axis of the structural extension assembly;
    a solar altitude electric motor used to adjust orientation of the solar oven radiation collection device to take into account changes in solar altitude with respect to time;
    a solar azimuth electric motor used to adjust orientation of the solar oven radiation collection device to take into account changes in azimuth with respect to time;
    a linear deploy override handle that allows an operator to disengage power transmission of linear deploy electric motor and manually adjust linear movement of the solar oven radiation collection device along the axis of the structural extension assembly;
    a solar altitude override handle that allows an operator to disengage power transmission of solar altitude electric motor and manually adjust position the solar oven radiation collection device for solar altitude;
    a solar azimuth override handle that allows an operator to disengage power transmission of solar azimuth electric motor and manually adjust position the solar oven radiation collection device for solar altitude;
    a first timer that controls operation of the solar altitude electric motor to allow positioning of solar oven radiation collection device to take into account changes in sun altitude over cook time;
    a second timer that controls operation of the solar azimuth electric motor to allow positioning of solar oven radiation collection device to take into account changes in sun azimuth over the cook time; and
    a third timer that reverses direction of solar altitude electric motor upon reaching of solar noon.

2. A solar oven system, comprising:
    a solar oven radiation collection device;
    a structural extension assembly that extends in a radial direction with respect to a structure;
    a moveable transport that provides linear movement of the solar oven radiation collection device along an axis of the structural extension assembly;
    a linear deploy electric motor that is used to control linear movement of the solar oven radiation collection device along the axis of the structural extension assembly;
    a solar altitude electric motor used to adjust orientation of the solar oven radiation collection device to take into account changes in solar altitude with respect to time;
    a solar azimuth electric motor used to adjust orientation of the solar oven radiation collection device to take into account changes in azimuth with respect to time;
    a linear deploy override handle that allows an operator to disengage power transmission of linear deploy electric motor and manually adjust linear movement of the solar oven radiation collection device along the axis of the structural extension assembly;
    a solar altitude override handle that allows an operator to disengage power transmission of solar altitude electric motor and manually adjust position the solar oven radiation collection device for solar altitude;
    a solar azimuth override handle that allows an operator to disengage power transmission of solar azimuth electric motor and manually adjust position the solar oven radiation collection device for solar altitude;
    a first timer that controls operation of the solar altitude electric motor to allow positioning of solar oven radiation collection device to take into account changes in sun altitude over cook time;
    a second timer that controls operation of the solar azimuth electric motor to allow positioning of solar oven radiation collection device to take into account changes in sun azimuth over the cook time; and
    a third timer that stops operation of the solar altitude electric motor and the solar azimuth electric motor when the cook time ends.

3. A solar oven system as in claim 1, additionally comprising:
    a fourth timer that stops operation of the solar altitude electric motor and the solar azimuth electric motor when the cook time ends.

4. A solar oven system, comprising:
    a solar oven radiation collection device;
    a structural extension assembly that extends in a radial direction with respect to a structure;
    a moveable transport that provides linear movement of the solar oven radiation collection device along an axis of the structural extension assembly;
    a linear deploy electric motor that is used to control linear movement of the solar oven radiation collection device along the axis of the structural extension assembly;
    a solar altitude electric motor used to adjust orientation of the solar oven radiation collection device to take into account changes in solar altitude with respect to time;
    a solar azimuth electric motor used to adjust orientation of the solar oven radiation collection device to take into account changes in azimuth with respect to time;

a linear deploy override handle that allows an operator to disengage power transmission of linear deploy electric motor and manually adjust linear movement of the solar oven radiation collection device along the axis of the structural extension assembly;

a solar altitude override handle that allows an operator to disengage power transmission of solar altitude electric motor and manually adjust position the solar oven radiation collection device for solar altitude;

a solar azimuth override handle that allows an operator to disengage power transmission of solar azimuth electric motor and manually adjust position the solar oven radiation collection device for solar altitude;

a first timer that controls operation of the solar altitude electric motor to allow positioning of solar oven radiation collection device to take into account changes in sun altitude over cook time, wherein the first timer controls the solar altitude electric motor so that positioning of solar oven radiation collection to take into account changes in sun altitude over cook time is done in increments with time durations of inactivity in between; and a second timer that controls operation of the solar azimuth electric motor to allow positioning of solar oven radiation collection device to take into account changes in sun azimuth over the cook time, wherein the second timer controls the solar azimuth electric motor so that positioning of solar oven radiation collection to take into account changes in sun azimuth over cook time is done in increments with time durations of inactivity in between.

5. A solar oven system, comprising:
a solar oven radiation collection device;
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a linear deploy override handle that allows an operator to disengage power transmission of linear deploy electric motor and manually adjust linear movement of the solar oven radiation collection device along the axis of the structural extension assembly;
a solar altitude override handle that allows an operator to disengage power transmission of solar altitude electric motor and manually adjust position the solar oven radiation collection device for solar altitude;
a solar azimuth override handle that allows an operator to disengage power transmission of solar azimuth electric motor and manually adjust position the solar oven radiation collection device for solar altitude;
a first timer that controls operation of the solar altitude electric motor to allow positioning of solar oven radiation collection device to take into account changes in sun altitude over cook time, wherein the first timer controls the solar altitude electric motor so that periodically position of the solar oven radiation collection is adjusted to take into account changes in sun altitude over cook time; and
a second timer that controls operation of the solar azimuth electric motor to allow positioning of solar oven radiation collection device to take into account changes in sun azimuth over the cook time, wherein the second timer controls the solar azimuth electric motor so that periodically position of the solar oven radiation collection is adjusted to take into account changes in sun azimuth over cook time.

6. A solar oven system, comprising:
a solar oven radiation collection device;
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a first timer that controls operation of the solar altitude electric motor to allow positioning of solar oven radiation collection device to take into account changes in sun altitude over cook time;
a second timer that controls operation of the solar azimuth electric motor to allow positioning of solar oven radiation collection device to take into account changes in sun azimuth over the cook time; and
a third timer that reverses direction of solar altitude electric motor upon reaching of solar noon.

7. A solar oven system, comprising:
a solar oven radiation collection device;
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a first timer that controls operation of the solar altitude electric motor to allow positioning of solar oven radiation collection device to take into account changes in sun altitude over cook time;
a second timer that controls operation of the solar azimuth electric motor to allow positioning of solar oven radiation collection device to take into account changes in sun azimuth over the cook time; and
a third timer that stops operation of the solar altitude electric motor and the solar azimuth electric motor when the cook time ends.

8. A solar oven system as in claim 6, additionally comprising:
a fourth timer that stops operation of the solar altitude electric motor and the solar azimuth electric motor when the cook time ends.

9. A solar oven system, comprising:
a solar oven radiation collection device;
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a first timer that controls operation of the solar altitude electric motor to allow positioning of solar oven radiation collection device to take into account changes in sun altitude over cook time, wherein the first timer controls the solar altitude electric motor so that positioning of solar oven radiation collection to take into account changes in sun altitude over cook time is done in increments with time durations of inactivity in between; and
a second timer that controls operation of the solar azimuth electric motor to allow positioning of solar oven radiation collection device to take into account changes in sun azimuth over the cook time, wherein the second timer controls the solar azimuth electric motor so that positioning of solar oven radiation collection to take into account changes in sun azimuth over cook time is done in increments with time durations of inactivity in between.

10. A solar oven system, comprising:
a solar oven radiation collection device;
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a first timer that controls operation of the solar altitude electric motor to allow positioning of solar oven radiation collection device to take into account changes in sun altitude over cook time, wherein the first timer controls the solar altitude electric motor so that periodically position of the solar oven radiation collection is adjusted to take into account changes in sun altitude over cook time; and
a second timer that controls operation of the solar azimuth electric motor to allow positioning of solar oven radiation collection device to take into account changes in sun azimuth over the cook time, wherein the second timer controls the solar azimuth electric motor so that periodically position of the solar oven radiation collection is adjusted to take into account changes in sun azimuth over cook time.

11. A positioning system that positions a solar oven radiation collection device, the positioning system, comprising:
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a linear deploy override handle that allows an operator to disengage power transmission of linear deploy electric motor and manually adjust linear movement of the solar oven radiation collection device along the axis of the structural extension assembly;
a solar altitude override handle that allows an operator to disengage power transmission of solar altitude electric motor and manually adjust position the solar oven radiation collection device for solar altitude;
a solar azimuth override handle that allows an operator to disengage power transmission of solar azimuth electric motor and manually adjust position the solar oven radiation collection device for solar altitude;
a first timer that controls operation of the solar altitude electric motor to allow positioning of solar oven radiation collection device to take into account changes in sun altitude over cook time; and
a second timer that controls operation of the solar azimuth electric motor to allow positioning of solar oven radiation collection device to take into account changes in sun azimuth over the cook time.

12. A positioning system as in claim 11, additionally comprising:
a third timer that reverses direction of solar altitude electric motor upon reaching of solar noon.

13. A solar oven system as in claim 11, additionally comprising:
a third timer that stops operation of the solar altitude electric motor and the solar azimuth electric motor when the cook time ends.

14. A positioning system as in claim 11, additionally comprising:
a third timer that reverses direction of solar altitude electric motor upon reaching of solar noon; and
a fourth timer that stops operation of the solar altitude electric motor and the solar azimuth electric motor when the cook time ends.

15. A positioning system, comprising:
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;

a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a linear deploy override handle that allows an operator to disengage power transmission of linear deploy electric motor and manually adjust linear movement of the solar oven radiation collection device along the axis of the structural extension assembly;
a solar altitude override handle that allows an operator to disengage power transmission of solar altitude electric motor and manually adjust position the solar oven radiation collection device for solar altitude;
a solar azimuth override handle that allows an operator to disengage power transmission of solar azimuth electric motor and manually adjust position the solar oven radiation collection device for solar altitude;
a first timer that controls operation of the solar altitude electric motor to allow positioning of solar oven radiation collection device to take into account changes in sun altitude over cook time, wherein the first timer controls the solar altitude electric motor so that positioning of solar oven radiation collection to take into account changes in sun altitude over cook time is done in increments with time durations of inactivity in between; and
a second timer that controls operation of the solar azimuth electric motor to allow positioning of solar oven radiation collection device to take into account changes in sun azimuth over the cook time, wherein the second timer controls the solar azimuth electric motor so that positioning of solar oven radiation collection to take into account changes in sun azimuth over cook time is done in increments with time durations of inactivity in between.

16. A positioning system, comprising:
a structural extension assembly that extends in a radial direction with respect to a structure;
a moveable transport that provides linear movement of the solar oven radiation collection device along an axis of the structural extension assembly;
a linear deploy electric motor that is used to control linear movement of the solar oven radiation collection device along the axis of the structural extension assembly;
a solar altitude electric motor used to adjust orientation of the solar oven radiation collection device to take into account changes in solar altitude with respect to time;
a solar azimuth electric motor used to adjust orientation of the solar oven radiation collection device to take into account changes in azimuth with respect to time;
a linear deploy override handle that allows an operator to disengage power transmission of linear deploy electric motor and manually adjust linear movement of the solar oven radiation collection device along the axis of the structural extension assembly;
a solar altitude override handle that allows an operator to disengage power transmission of solar altitude electric motor and manually adjust position the solar oven radiation collection device for solar altitude;
a solar azimuth override handle that allows an operator to disengage power transmission of solar azimuth electric motor and manually adjust position the solar oven radiation collection device for solar altitude;
a first timer that controls operation of the solar altitude electric motor to allow positioning of solar oven radiation collection device to take into account changes in sun altitude over cook time, wherein the first timer controls the solar altitude electric motor so that periodically position of the solar oven radiation collection is adjusted to take into account changes in sun altitude over cook time; and
a second timer that controls operation of the solar azimuth electric motor to allow positioning of solar oven radiation collection device to take into account changes in sun azimuth over the cook time, wherein the second timer controls the solar azimuth electric motor so that periodically position of the solar oven radiation collection is adjusted to take into account changes in sun azimuth over cook time.

* * * * *